(12) United States Patent
Fair

(10) Patent No.: US 9,817,732 B1
(45) Date of Patent: Nov. 14, 2017

(54) METHOD FOR CONTROLLING FAILOVER AND FAILBACK OF VIRTUAL ENDPOINTS IN A SCSI NETWORK

(71) Applicant: EMC IP Holding Company LLC, Hopkinton, MA (US)

(72) Inventor: Robert Fair, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 117 days.

(21) Appl. No.: 14/675,440

(22) Filed: Mar. 31, 2015

(51) Int. Cl.
*G06F 11/00* (2006.01)
*G06F 11/20* (2006.01)

(52) U.S. Cl.
CPC .................. *G06F 11/2007* (2013.01)

(58) Field of Classification Search
USPC .................................................. 714/4.11, 4.1
See application file for complete search history.

(56) References Cited

U.S. PATENT DOCUMENTS

| | | | |
|---|---|---|---|
| 6,888,792 B2 * | 5/2005 | Gronke | H04L 45/00 370/227 |
| 7,711,789 B1 | 5/2010 | Jnagal | |
| 7,782,869 B1 | 8/2010 | Chitlur Srinivasa | |
| 8,077,730 B2 | 12/2011 | Maveli | |
| 8,213,447 B2 | 7/2012 | Hurley | |
| 8,274,881 B2 | 9/2012 | Allen | |
| 8,626,967 B1 | 1/2014 | Naik | |
| 8,839,043 B1 | 9/2014 | Long | |
| 8,949,656 B1 | 2/2015 | Ninan | |
| 9,298,566 B2 | 3/2016 | LeFevre | |
| 9,390,034 B1 * | 7/2016 | Fair | G06F 15/177 |
| 2002/0129246 A1 | 9/2002 | Blumenau | |
| 2003/0126242 A1 | 7/2003 | Chang | |
| 2004/0199353 A1 * | 10/2004 | Bingham | G06F 11/2221 702/122 |
| 2005/0102603 A1 | 5/2005 | Tapper | |
| 2007/0174851 A1 | 7/2007 | Smart | |
| 2007/0239944 A1 | 10/2007 | Rupanagunta | |
| 2008/0005311 A1 * | 1/2008 | Ali | G06F 13/4226 709/224 |
| 2008/0127326 A1 | 5/2008 | Dugan | |
| 2008/0162813 A1 | 7/2008 | Haustein | |
| 2009/0254640 A1 | 10/2009 | Otani | |
| 2009/0307330 A1 | 12/2009 | Allen | |
| 2009/0307378 A1 | 12/2009 | Allen | |
| 2010/0149980 A1 * | 6/2010 | Cheung | H04Q 3/0087 370/235 |
| 2010/0250785 A1 | 9/2010 | Shin | |
| 2010/0293552 A1 | 11/2010 | Allen | |

(Continued)

*Primary Examiner* — Sarai Butler
(74) *Attorney, Agent, or Firm* — Staniford Tomita LLP

(57) ABSTRACT

Embodiments are described for systems and methods that facilitate control of virtual endpoint failover/failback operations in a SCSI target network environment. During failover, SCSI target virtual endpoints failover to a secondary SCSI target port when the primary port fails, and failback to the primary port when the primary port is corrected. Embodiments include a method of efficiently controlling failover and failback operations of virtual endpoints where such operations may have different operating characteristics and be asynchronously initiated, and a method of globally or selectively cancelling failover and failback operations based on multiple system and operating conditions.

19 Claims, 18 Drawing Sheets

(56) References Cited

U.S. PATENT DOCUMENTS

| | | | |
|---|---|---|---|
| 2011/0239014 A1* | 9/2011 | Karnowski | G06F 1/3209 |
| | | | 713/320 |
| 2011/0239213 A1* | 9/2011 | Aswani | G06F 9/45558 |
| | | | 718/1 |
| 2011/0302287 A1 | 12/2011 | Muppirala | |
| 2012/0079499 A1 | 3/2012 | Gold | |
| 2012/0084071 A1 | 4/2012 | Cyr | |
| 2012/0254554 A1* | 10/2012 | Nakajima | G06F 3/0607 |
| | | | 711/154 |
| 2013/0198739 A1* | 8/2013 | Razdan | G06F 9/45558 |
| | | | 718/1 |
| 2013/0246666 A1 | 9/2013 | Vemuri | |
| 2014/0281715 A1* | 9/2014 | Khan | G06F 11/261 |
| | | | 714/28 |
| 2014/0317265 A1* | 10/2014 | James | H04L 67/1004 |
| | | | 709/224 |
| 2014/0317437 A1 | 10/2014 | LeFevre | |
| 2015/0106518 A1 | 4/2015 | Amann | |
| 2015/0269039 A1 | 9/2015 | Akirav | |
| 2016/0034366 A1* | 2/2016 | Anglin | G06F 11/1458 |
| | | | 714/4.11 |

* cited by examiner

METHOD FOR CONTROLLING FAILOVER AND FAILBACK OF VIRTUAL ENDPOINTS IN A SCSI NETWORK

TECHNICAL FIELD

Embodiments are generally directed to data storage systems, and more specifically to controlling virtual endpoint failover and failback operations in a SCSI network.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern computer data storage systems, such as storage area networks (SAN) in enterprise environments often use the Fibre Channel (FC) network technology to provide high-speed (e.g., 2 to 16 gigabit/second) data transfers. A Fibre Channel network comprises a number of ports that are connected together, where a port is any entity that actively communicates over the network (either optical fiber or copper), where a port is usually implemented in a device such as disk storage or a Fibre Channel switch. The Fibre Channel protocol transports SCSI commands over Fibre Channel networks, and network topologies include point-to-point, arbitrated loop (devices in a ring), and switched fabric (devices/loops connected through switches). The Fibre Channel protocol comprises five layers in which a protocol mapping layer (FC4) encapsulates application protocols (i.e., SCSI or IP) into protocol data units (PDUs) for delivery to the physical layers (FC2 to FC0).

The SCSI (Small Computer System Interface) standards used by Fibre Channel networks define certain commands, protocols and electrical/optical interface characteristics for connected devices, such as hard disks, tape drives, and controllers. In data storage networks, a SCSI initiator is typically a computer that initiates a SCSI session by sending a SCSI command, and SCSI target is a data storage device that responds to initiators' commands and provides the required input/output data transfers.

As the needs for large-scale data storage have increased, storage virtualization techniques have been developed improve functionality and allow location independence. Storage virtualization abstracts logical storage (e.g., at the block or file level) from the physical storage devices (e.g., disk arrays). The physical storage resources are aggregated into storage pools to form the logical storage, which presents the logical storage space and transparently maps the logical space to physical storage locations. The Fibre Channel standard includes an N_Port ID Virtualization (NPIV) feature in which multiple Fibre Channel node port (N_Port) IDs can share a single physical N_Port. This allows multiple Fibre Channel initiators to occupy a single physical port, easing hardware requirements in SAN systems. This mechanism allows each virtual server to see only its own storage and no other virtual server's storage. NPIV thus allows a single N_Port to register multiple World Wide Port Names (WWPNs) and N_Port identification numbers. In present systems, Fibre Channel base ports and virtual ports are discretely managed and configured on a one-to-one basis in which a physical port is associated with a single virtual port. This makes reconfiguration and management of these ports relatively difficult in most operating conditions. Furthermore, NPIV ports are directly administered, which adds the disadvantage of increased management complexity and difficulty in performing operations such as storage device failover and migration. As the amount of data in enterprise applications increases, the use of highly-available storage is a key consideration and system requirement. A highly-available storage framework allows transparent storage of the same data across several physically separated machines connected within a SAN or other TCP/IP network. For such systems, it is important that storage devices and data centers are able to be efficiently and quickly reconfigured or replicated in case of failure conditions or even routine maintenance. Reconfiguration and migration tasks in present systems is typically a static operation in which the storage devices and/or entire network is taken down to reconfigure the system or perform large-scale migration of the data. Such as requirement is obviously disruptive to system operation and can cause issues with regard to system performance and integrity. Current implementations of failover operations in typical data storage networks generally do not provide for automatic failover in the event of port failure. Failover operations must thus be initiated automatically, and after failover is manually done, storage devices may be seen as different devices on the initiator host. This typically requires a device rescan on the operating system level and/or the backup application level. Failover and failback operations of virtual endpoints in a SCSI target network may also have different properties, operational parameters, and be asynchronously initiated. It may also be desired to selectively or globally cancel these operations based on multiple conditions or system requirements. Present systems, however, do not facilitate easy or efficient control of failover and failback operations of virtual endpoints on an individual operation basis. This means that all failover/failback operation are treated the same with respect to management and control, or they are managed as independent tasks, which adds greatly to processing overhead and system administration.

What is needed therefore is a method of efficiently controlling failover and failback operations of virtual endpoints where such operations may have different operating characteristics and be asynchronously initiated. What is further needed is a method of globally or selectively cancelling failover and failback operations based on multiple system and operating conditions.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1A:
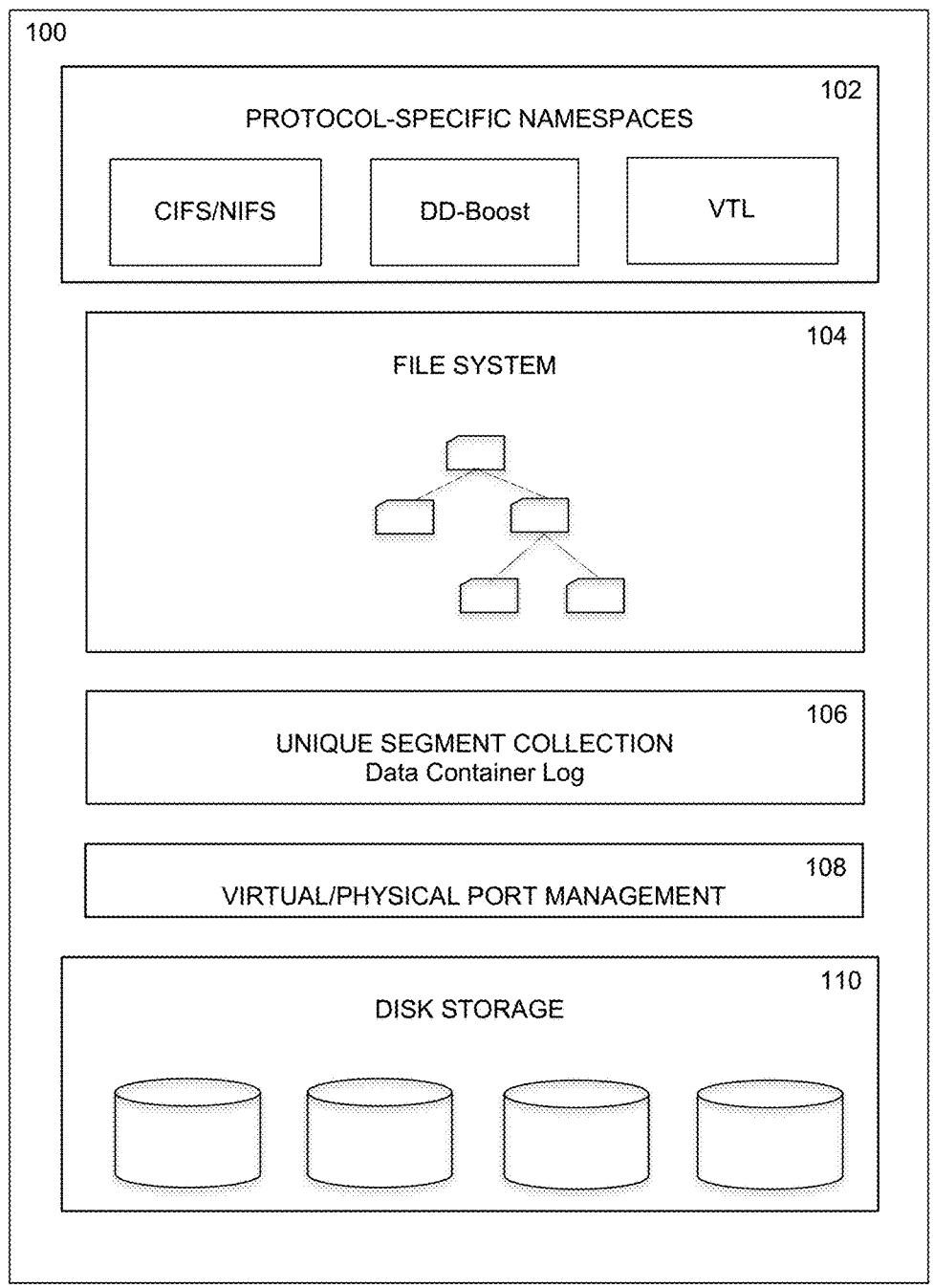
FIG. 1A illustrates logical and physical system layers for a data storage system that implements a system for managing NPIV and non-NPIV Fibre Channel ports, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Disclosed herein are methods and systems of simplifying the management of both NPIV and non-NPIV Fibre Channel configurations for SAN and virtual SAN data storage systems. Specifically, embodiments include methods and systems that facilitate non-disruptive reconfiguration of storage devices in a storage area network, such as by allowing the dynamic configuration of SCSI transport endpoints and NPIV virtual ports in Fibre Channel networks. Embodiments further include methods that facilitate control of virtual endpoint failover/failback during an administrative SCSI target port disable or enable operation. In this case, SCSI target virtual endpoints may failover to a secondary SCSI target port when the primary port fails. When the primary port is corrected and enabled by the administrator the failover method pulls virtual endpoints on secondary ports back to the primary port under administrator control; and if an administrator wishes to manually disable a SCSI target port the failover operation pushes (failover) all virtual endpoints currently using the port as a primary to a secondary port.

Embodiments may be implemented in a data storage system that performs backup, archiving, and disaster recovery operations with deduplication functionality. The described embodiments allow for dynamic management of SCSI target virtual endpoints in a way that provides maximum flexibility without causing or incurring disruption to or from other virtual endpoints. Such a system is illustrated by the data domain restorer (DDR) system provided by EMC Corporation, though other similar systems are also possible.

FIG. 1A illustrates logical and physical system layers for a data storage system that implements a system for managing NPIV and non-NPIV Fibre Channel ports, under some embodiments. FIG. 1A illustrates functional layers for an example large-scale deduplication storage system, such as a DDR system. System 100 illustrates the functional layers within a data domain or DDR operating system (DD OS) in which protocol-specific namespaces are presented to clients/applications for accessing a logical file system layer. The files and directories all reference the same pool of unique segments (collections) which is made up of log-structured containers that organize the segments on disk to optimize data throughput and deduplication effectiveness. As shown in FIG. 1A, the protocol-specific namespaces 102 are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Files and directories for each namespace are stored in an MTree within the file system 104. With the VTL interface, the virtual tape cartridges are stored as files under special directories MTree snapshots within the DD OS are logical and share the same underlying data segments in the collection. The unique segment layer 106 is a set of files (or virtual tapes) and logical MTree snapshots. The system identifies and eliminates duplicates within each container and then writes compressed deduplicated segments to physical disk. Segments are unique within the collection, and each DDR system has a single collection that is stored as a log of segment locality containers. The collection containers layer over they physical storage devices 110 that may be RAID-enabled disk drive blocks.

For DDR system 100, the Fibre Channel protocol may be employed by one or more of the namespace interfaces, such as the VTL or DD-Boost or VDisk namespaces to direct data to devices within the disk storage subsystem 110 that comprise SCSI targets. Fibre Channel allows target names to be advertised as conventional world wide names (WWPN) or virtual names (NPIV). In an embodiment, the Fibre Channel protocol is modified through enhancements to the SCSI Target subsystem to take advantage of NPIV functionality on the DDR system 100, including endpoint flexibility and failover. Thus, as shown in FIG. 1A, a virtual/physical port management layer or component 108 defines endpoints to represent SCSI targets within the Fibre Channel protocol. Endpoints are neither physical nor virtual, but are abstracted objects having attributes that can be moved around the system, and moved between physical or virtual ports dynamically (i.e., at runtime or "on the fly"). The management layer 108 (referred to either as a "virtual/physical port management layer" or "endpoint management layer") provides a unified input for endpoints representing physical, virtual, or both types of ports depending on the system configuration. Both types of ports (virtual/physical) can be mixed seamlessly for addressing by data sources so that the system administrator does not need to be concerned with whether network traffic is carried over physical or virtual fiber channels. Unlike present known Fibre Channel systems in which a physical port using WWPN is configured with NPIV on top for virtualization, the virtual/physical port management layer provides for unified management for physical ports, virtual ports, or a mix of physical and virtual ports.

Figure 1B:
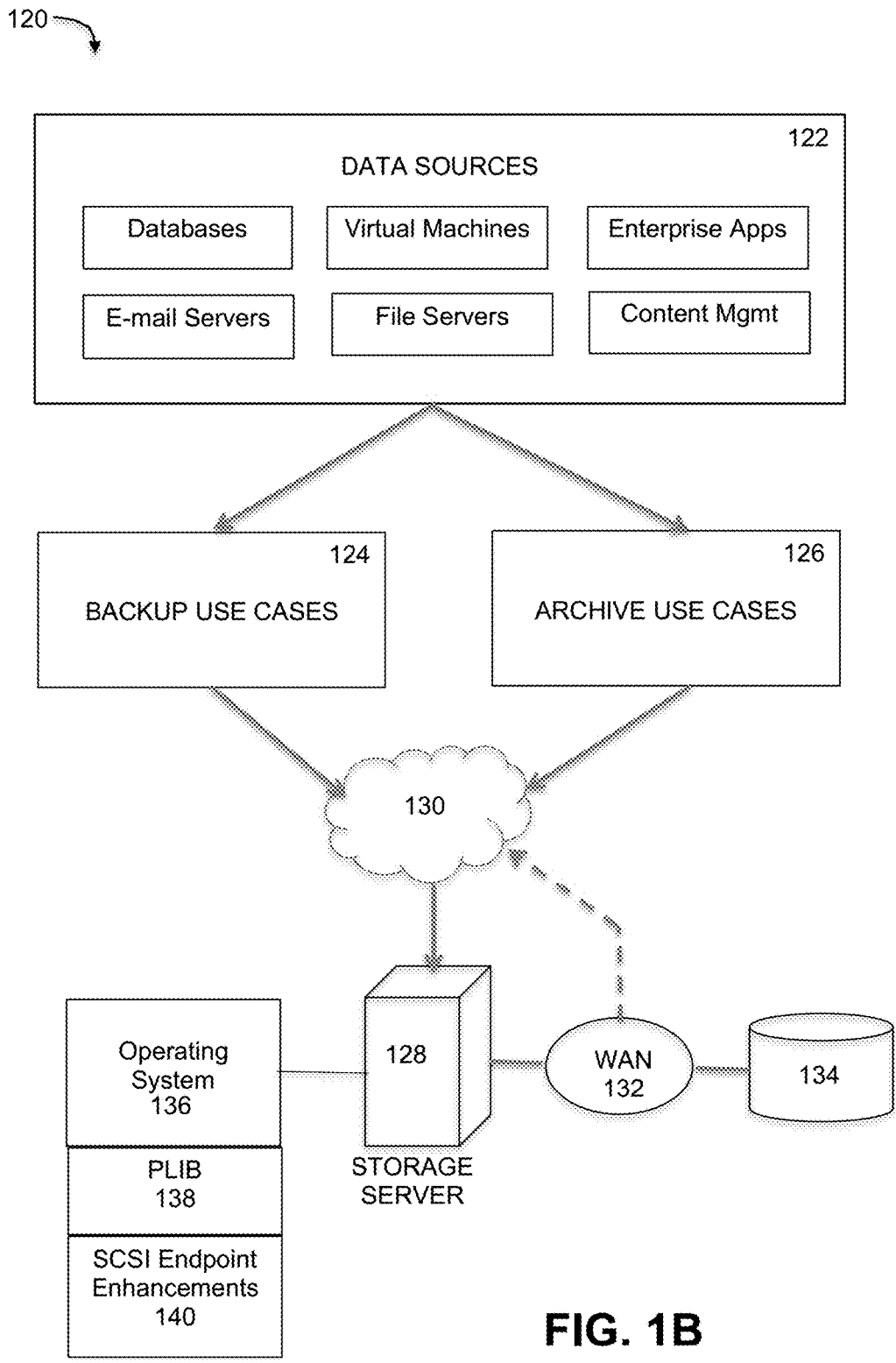
FIG. 1B is a system diagram of a deduplication data storage system implementing the layers of FIG. 1A, and that implements a SCSI endpoint enhancement method, under some embodiments.

FIG. 1B is a system diagram of a deduplication data storage system that implements embodiments of SCSI endpoint enhancement method in accordance with the virtual/physical port management layer of FIG. 1A. In general, an endpoint in the SCSI Target architecture corresponds to a virtual port on the DDR. As shown in diagram 120 of FIG. 1B, data from a number of different data sources 122 is transferred to cloud or networked-based storage devices through a storage server 128. The data is stored through backup 124 and/or archive 126 use cases and the storage server 128 performs deduplication tasks to deduplicate the data during these storage operations to maximize performance and minimize disk storage requirements. In an example implementation, the deduplicated data can be replicated over a WAN (wide area network) 132 to a remote storage site 134 or a service provider site in the cloud 130 for disaster recovery operations, or other similar applications. The storage server computer 128 executes an operating system (OS) 136 that consolidates both backup and archive data on the same infrastructure. For an embodiment in which network 120 represents a DDR-based deduplication storage system, storage server 128 may be implemented as a DDR Deduplication Storage server provided by EMC Corporation. Network 120 may also represent a network system that implements a highly-available storage framework that allows transparent storage of the same data across several physically separated machines connected within a SAN or other TCP/IP network.

In general, the operating system 136 includes an OS kernel and associated target drivers to control the transmission of data to and from the storage devices, such as local storage 134 and/or cloud-based storage accessible through the cloud 130. In an embodiment, the OS kernel target drivers are configured to support NPIV, as defined by the Fibre Channel protocol. To allow user space applications to utilize the NPIV functionality in the kernel, the PLIB 138 is enhanced to support this new functionality. PLIB is a Peripheral Library (PLIB) comprising a simple access library that provides a consistent but very low-level interface to a peripheral on the microcontroller. The PLIB hides register details, making it easier to write drivers that support multiple microcontroller families, and is primarily used to implement device drivers (and some system services) to make them portable.

Figure 2:
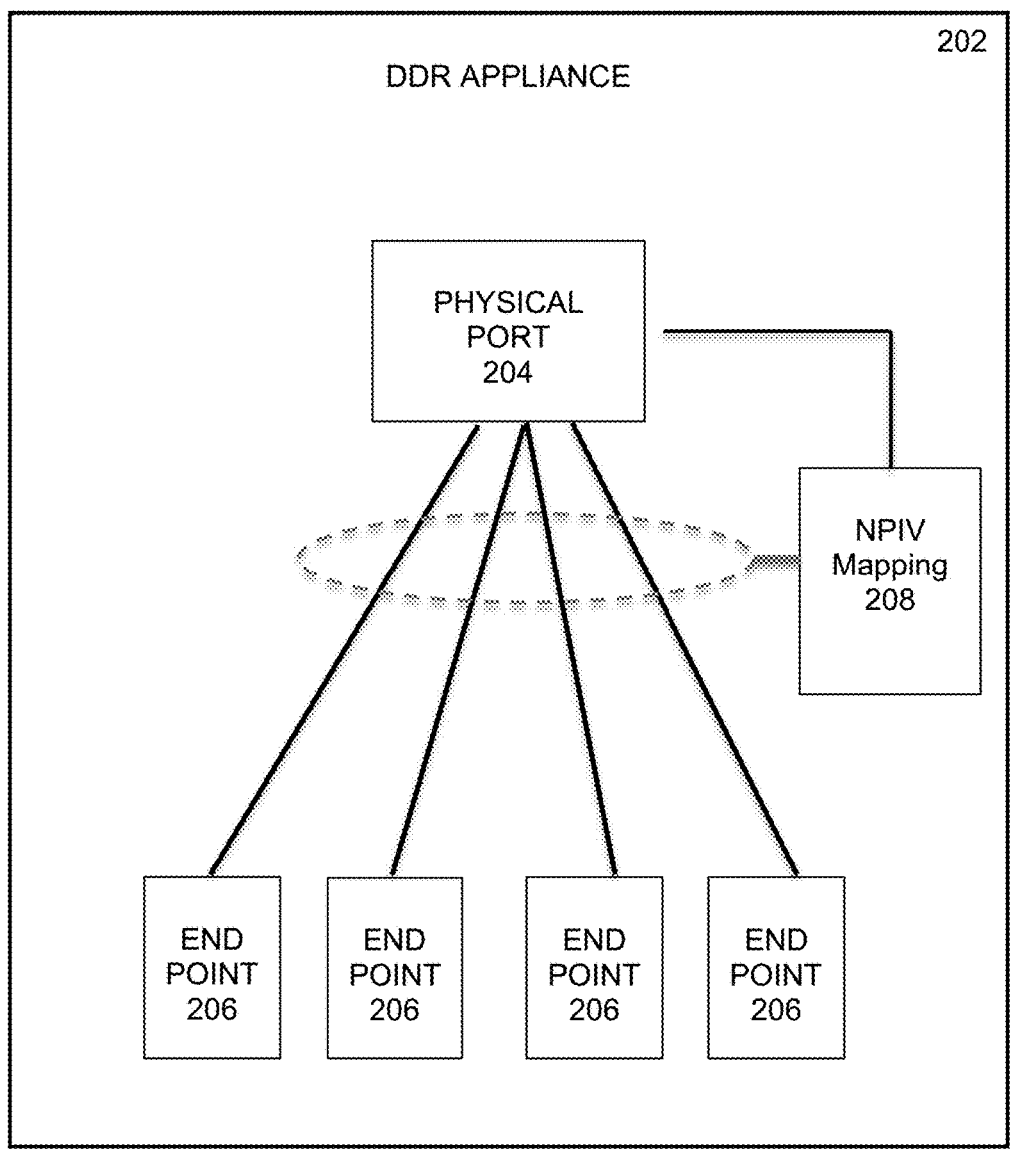
FIG. 2 illustrates an organization of physical ports and associated endpoints within a network device, under some embodiments.

FIG. 2 illustrates an organization of physical ports and associated endpoints within a network device, under some embodiments. In FIG. 2, a physical network device or machine, such as a DDR appliance 202 has at least one physical port 204 which may be embodied as an HBA slot or similar network node. In an embodiment, and NPIV mapping component or function 208 allows multiple endpoints 206 to be assigned or mapped to the single physical port 204. Any practical number of endpoints, such as up to 128 endpoints may be mapped to each physical port 204 on a device 202. In a Fibre Channel system, each endpoint 206 is a named generalization of a transport-specific name in the SCSI target. It is used to expose SCSI target devices based on SCSI target access groups. The endpoint name is unique and may be modified by the user. The NPIV mapping component 208 embodies the NPIV Fibre Channel technology that allows multiple N_Port IDs to share a single physical N_Port. Each N_Port has a unique identity (WWPN) in the network, and an N_Port could be a Host Bus Adapter (HBA) in a server or a target port on a storage array. Physical port 204 may be a base port, which is a port that always exists within a physical port. As shown in FIG. 2, one physical port could have multiple virtual ports 206. When created, each virtual port is assigned a unique WWPN which is used by HBA firmware to perform a login. When port a failover feature is used, a virtual port serves as an endpoint. While a WWPN may be used to name a port in a Fibre Channel network, a WWNN (world wide node name) may be used to name a node in the network.

As opposed to present known Fibre Channel systems in which each physical port 204 is mapped to a single virtual port in a one-to-one relationship, the NPIV mapping component 208 allows the mapping of multiple endpoints (which can be virtual and/or physical) to a single physical port. This means that virtual port management (e.g., port migration, moving ports, removing ports, adding ports, etc.) can be performed on many virtual ports in a unified manner rather than simplistically through the present one-to-one port management procedures. Embodiments thus allow a SAN system to be configured with virtual endpoints that span both base and virtual ports. This is accomplished by adding NPIV features functionality to data domain (or similar) operating systems in order to virtualize transport endpoints between base and virtual ports. This mechanism also significantly impacts the dynamic management and configuration of DD OS based systems. Traditionally, reconfiguration or recovery from failure was a static process requiring taking down a system to reconfigure or repair ports. With the virtualization of SCSI target endpoints through NPIV mapping mechanisms, data storage systems can be reconfigured dynamically or on-the-fly while the system is up and running. This also allows movement of virtual ports among physical ports, or even among different systems in the network. In a highly available system, such as critical data recovery systems, the ability to migrate on the fly by moving endpoints port-to-port or system-to-system greatly facilitates the ability for data to be maintained and protected in a non-disruptive manner.

In an embodiment, the NPIV functionality is enhanced to perform endpoint creation on user demand, protocol segregation based endpoint, Fibre Channel port failover, and provide enhanced quality of service. Embodiments include enhancements to the PLIB that support NPIV functionality and that maintain PLIB compatibility with existing PLIB consumers. For purposes of description, certain interface names, programming elements/objects, and programming code segments will be listed and will use conventions as defined by the Fibre Channel protocol and/or in accordance with a specific operating system, such as the Data Domain Operating System (DD OS) provided by EMC Corporation. Adaptation to other operating systems can be performed using techniques known to those of ordinary skill in the art.

NPIV Functionality

Figure 3A:
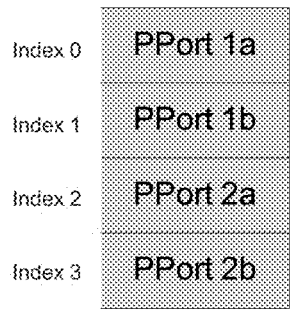
FIG. 3A illustrates an example initial state of a PLIB port table with four physical ports.
Figure 3B:
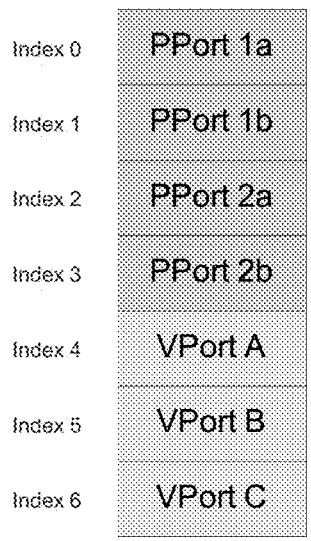
FIG. 3B illustrates the PLIB port table of FIG. 3A with the addition of virtual ports (VPorts)
Figure 3C:
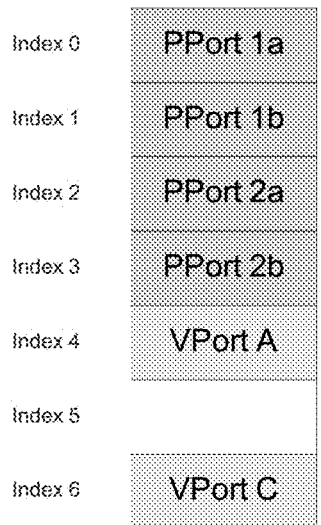
FIG. 3C illustrates the PLIB port table of FIG. 3B with a virtual port deleted.
Figure 3D:
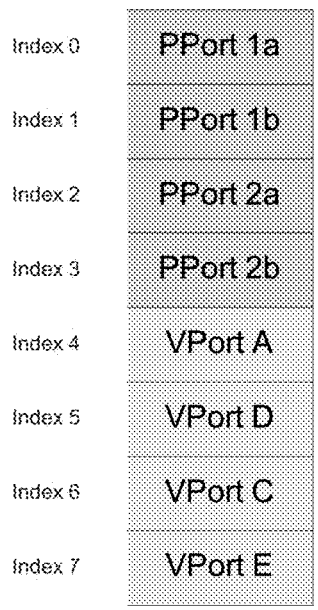
FIG. 3D illustrates the PLIB port table of FIG. 3C with additional virtual ports added

Certain changes are made to the operating system, including the PLIB to accommodate the NPIV feature of Fibre Channel. For example, the size of PLIB port table is extended from 8 to 64, which is defined as DD_PLIB_SCSITGT_PORT_MAX. The size can be extended further to 256 once SCSI Target has support for a 256 bit port bitmask. The port table will now contain both physical ports and virtual ports. PLIB port index is unique across all physical ports and virtual ports. That means a physical port and a virtual port cannot share the same port index. The number of physical ports is static while number of virtual ports is dynamic because virtual port can be created and deleted. The first n entries of PLIB port table are for physical port, where n is the number of physical ports on the system. These entries are fixed and contiguous. The remaining entries in the port table are used for virtual ports. These entries are dynamic and not contiguous. There could be an empty entry in between two filled entries. When a virtual port is created, it will be placed in the first available entry in the port table. When a virtual port is deleted, its entry will be cleared in the port table. FIGS. 3A-3D illustrate changes to the PLIB port table to accommodate NPIV for some example cases, under an embodiment. FIG. 3A illustrates an example initial state of a PLIB port table with four physical ports, denoted ports (PPorts) 1a, 1b, 2a, and 2b, and assigned indexes 0 to 3, respectively. FIG. 3B illustrates the PLIB port table of FIG. 3A with the addition of virtual ports (VPorts) A, B, and C. FIG. 3C illustrates the PLIB port table of FIG. 3B with a virtual port (VPort B) deleted; and FIG. 3D illustrates the PLIB port table of FIG. 3C with additional virtual ports (VPorts D and E) added. As shown in FIG. 3D, VPort D replaces deleted VPort B (at Index 5), and new VPort E is appended as Index 7.

With respect to user interfaces, PLIB interfaces are abstracted within SCSI target (scsitgt) that provides interfaces to the command line (CLI). With respect to programming interfaces, PLIB interfaces that can be used for physical port only are indicated by "pport_idx" in the parameter they take. PLIB interfaces that can be used for virtual port only are indicated by "vport_idx" in the parameter they take. PLIB interfaces that can be used for both physical and virtual ports are indicated by "port_idx" in the parameter they take.

In an embodiment, to support NPIV functionality, several new PLIB interfaces are defined, as described with reference to certain programming examples below. One new interface is the create virtual port interface, which is used to create a virtual port on physical port specified by pport_idx. The virtual port will be created using the WWPN and WWNN passed in the second and third arguments. After created, virtual port will be in disabled state with target mode not set. To use the virtual port, target mode of the virtual port must be first set using dd_plib_scsitgt_set_port_target_mode( ) and the virtual port must then be enabled using dd_plib_scsitgt_set_port_state( ).

```
/**
 * Create virtual port on the specified physical port
 *   index
 *
 * @param pport_idx (i) specific physical port index
 *   where virtual port to be
 * created
 * @param wwpn (i) wwpn of virtual port to be created
 * @param wwnn (i) wwnn of virtual port to be created
 *
 * @return PLIB port index on success or -errno on
 *   failure
 */
int dd_plib_scsitgt_create_vport(dd_uint32_t pport_idx,
    dd_uint64_t wwpn, dd_uint64_t wwnn)
```

Another new interface is the delete virtual port, which is used to delete a virtual port specified by vport_idx. A virtual port can be deleted in any state and does not need to be disabled first.

```
/**
 * Delete virtual port specified by the virtual port index
 *
 * @param vport_idx (i) specific virtual port index to be
     deleted
 *
 * @return 0 on success or -errno on failure
 */
int dd_plib_scsitgt_delete_vport(dd_uint32_t vport_idx)
```

A return number interface is used to get the number of virtual ports that are currently present on the system

```
/**
 * Return number of SCSITGT virtual ports
 *
 * @param void
 *
 * @return Number of SCSITGT virtual ports
 */
dd_uint32_t dd_plib_scsitgt_get_num_vports(void)
```

A get_port_info interface is used to get various information (such as PLIB port index, port state, port id, WWPN, WWNN, etc.) of one or multiple virtual ports in one function call. The information is returned in the form of dd_plib_scsitgt_port_info_t structure which is the same structure used in dd_plib_scsitgt_get_port_info( ). At a minimum, the vinfo buffer must have the size for as many number of virtual ports requested in num_requested_vports argument. The vinfo buffer will be filled with as many number of virtual ports requested or as many number of virtual port currently present (at the moment the interface is invoked) whichever is less. It is recommended that dd_plib_scsitgt_get_num_vports( ) be called first to get the number of virtual ports currently present on the system so that the vinfo buffer can be allocated for the number of virtual ports present. The interface will set the num_present_vports parameter to the number of virtual ports present at the time the interface is invoked. If num_present_vports returned is less than num_requested_vports then it means there are fewer numbers of virtual ports present than it is requested and the vinfo buffer only contains as many virtual ports stated in num_present_vports. If num_present_vports returned is greater than num_requested_vports then it means there are more virtual ports present than it is requested and the vinfo buffer only contains as many virtual ports stated in num_requested_vports. If PLIB port index of a virtual port is known, dd_plib_scsitgt_get_port_info( ) can also be used to get port information of virtual port specified by the PLIB port index.

```
/**
 * Get port info w/o lock for as many number of virtual
     ports requested or as
 * many number of virtual ports currently present on the
     system whichever less
 *
 * @param vinfo (o) port info buffer with size enough
     for
 * number of virtual ports requested
 * @param num_requested_vports (i) number of virtual
     ports requested
 * @param num_present_vports (o) number of virtual
     ports currently
 * present on the system
 *
 * @return 0 on success or -errno on failure
 */
int dd_plib_scsitgt_get_vport_info(dd_plib_scsitgt_port_info_t *vinfo, dd_uint32_t num_requested_vports, dd_uint32_t *num_present_vports)
```

The following interface is used to get the maximum number of virtual ports that can be created on the system. This is limited by the number of available virtual WWN (world wide names) on the system and the total number of maximum virtual ports supported on each physical port.

```
/**
 * Return maximum number of virtual ports that can be
     created on the
 * DDR system
 *
 * @return maximum number of virtual ports on success
     or -errno on failure
 */
int dd_plib_scsitgt_get_max_vports(void)
```

The following interface is used to get the maximum number of virtual ports that can be created on physical port specified by pport_idx. This interface only takes PLIB port index of physical port. If PLIB port index of virtual port is passed, an error will be returned.

```
/**
 * Return maximum number of virtual ports that can be
     created on the specified
 * physical port index
 *
 * @param pport_idx (i) specific physical port index
 *
 * @return maximum number of virtual ports on success
     or -errno on failure
 */
int  dd_plib_scsitgt_pport_get_max_vports(dd_uint32_t
     pport_idx)
```

This return number of virtual port interface listed immediately below is used to get the number of virtual ports that are currently present on physical port specified by pport_idx. This interface only takes PLIB port index of physical port. If PLIB port index of virtual port is passed, an error will be returned.

```
/**
 * Return number of virtual ports that currently exist on
     the specified
 * physical port index
 *
 * @param pport_idx (i) specific physical port index
 *
 * @return number of virtual ports on success or -errno
     on failure
 */
int  dd_plib_scsitgt_pport_get_num_vports(dd_uint32_t
     pport_idx)
```

The get NPIV capability of the switch interface is used to get the NPIV capability of the physical HBA port specified by pport_idx and the switch in which the HBA port is connected to. If NPIV is supported, then DD_PLIB_FC_NPIV_SUPPORTED will be returned in the corresponding capability. Otherwise DD_PLIB_FC_NPIV_NOT_SUPPORTED will be returned. If the link of the HBA port is not online, then the switch's NPIV capability cannot be determined. Therefore DD_PLIB_FC_NPIV_UNKNOWN will be returned in the switch capability. Virtual ports should be created when NPIV is supported on both HBA port and switch.

```
/**
 * Get NPIV capability of the switch and HBA of the
     specified physical port
 * index
 *
 * @param pport_idx (i) specific physical port index
 * @param switch_cap (o) NPIV switch capability
 * @param hba_cap (o) NPIV hba capability
 *
 * @return 0 on success or -errno on failure
 */
int     dd_plib_scsitgt_pport_get_npiv_cap(dd_uint32_t
    pport_idx,    dd_plib_fc_npiv_cap_t    *switch_cap,
    dd_plib_fc_npiv_cap_t *hba_cap)
```

The get port state interface listed immediately below is used to get the port state of physical or virtual port specified by port_idx. This interface can take PLIB port index of physical port or virtual port. It is introduced to optimize periodic polling done by the SCSI target which currently uses dd_plib_scsitgt_get_port_info( ) to get mostly port state.

```
/**
 * Get port state for specified port index
 *
 * @param port_idx (i) specific port index
 * @param port_state (o) port state
 *
 * @return 0 on success or -errno on failure
 */
int dd_plib_scsitgt_get_port_state(dd_uint32_t port_idx,
    dd_plib_fc_port_state_t *port_state)
```

With respect to data structure definitions, a new field parent_port_idx with data type dd_int32_t is added to dd_plib_scsitgt_port_info_t structure. The new field is used to store the physical port index of a virtual port in the PLIB port table. If the port itself is a physical port, the field will be—−1 which is defined as DD_PLIB_NO_PARENT.

```
typedef struct dd_plib_scsitgt_port_info {
    dd_uint32_t port_idx;
    dd_uint32_t virtual_port_idx;
    dd_int32_t parent_port_idx;
    dd_uint32_t slot;
    ....
    dd_uint32_t fcp2_retry;
} dd_plib_scsitgt_port_info_t;
```

The virtual_port_idx field in the above structure is usually of value 0. Now the field will be non-zero if the port is a virtual port. It indicates the port index of a virtual port within its physical port. It is unique within the same physical port but not unique across multiple physical ports. If the port itself is a physical port, its virtual_port_idx field will be 0. virtual_port_idx should not be confused with port index used in PLIB port table. It is assigned by the kernel driver so that it has nothing to do with index within PLIB port table. The use of the count field within dd_plib_table_t of dd_plib_scsitgt_ports is also modified, as follows.

```
typedef struct {
    const uint32_t limit;
    uint32_t count;
    void *const entry;
} dd_plib_table_t;
dd_plib_table_t dd_plib_scsitgt_ports={
    DD_PLIB_SCSITGT_PORT_MAX, 0, scsitgt_ports
};
```

The dd_plib_scsitgt_ports.count is used for both physical and virtual port counts. The two least significant bytes are used for physical port count. The two most significant bytes are used for virtual port count. dd_plib_scsitgt_ports.count must not be accessed directly. Instead these two macros: DD_PLIB_SCSITGT_PORT_COUNT and DD_PLIB_SCSITGT_VPORT_COUNT, must be used to access physical and virtual port counts. A new data structure dd_plib_fc_npiv_cap_t is introduced to define NPIV capability of the HBA port and the switch.

```
typedef enum {
    DD_PLIB_FC_NPIV_UNKNOWN,
    DD_PLIB_FC_NPIV_SUPPORTED,
    DD_PLIB_FC_NPIV_NOT_SUPPORTED,
} dd_plib_fc_npiv_cap_t;
```

With respect to threading and locking, all PLIB interfaces described above are executed in the caller's context. All accesses to PLIB port table (dd_plib_scsitgt_ports) are protected with dd_plib_mutex through a dd_plib_mutex_lock( ) function call.

The following sample code shows how to get the maximum number of virtual ports supported on the system and per physical port.

```
{
    int system_max_vports, pport_max_vports;
    dd_uint32_t num_pports;
    ....
    system_max_vports=dd_plib_scsitgt_get_max_vports(
        );
    if (system_max_vports <0) {
        /* Error */
    }
    ....
    num_pports=dd_plib_scsitgt_get_num_ports( );
    for (i=0; i<num_pports; i++) {
        pport_max_vports=dd_plib_scsitgt_pport_get_
            max_vports(i);
        if (pport_max_vports <0) {
    /* Error */
        }
        ....
    }
}
```

The following sample code shows how to get NPIV capability of the HBA port and the switch before creating a virtual port.

```
{
    dd_plib_fc_npiv_cap_t hba_cap, switch_cap;
    ....
    /* Get NPIV capability of physical port with PLIB port
        index 0 and the switch the port is connected to */
    if (dd_plib_scsitgt_pport_get_npiv_cap(0, &switch_cap, &hba_cap)<0) {
        /* Error */
    }
    if ((hba_cap==DD_PLIB_FC_NPIV_SUPPORTED)
        &&      (switch_cap==DD_PLIB_FC_NPIV_
        SUPPORTED)) {
        dd_plib_scsitgt_create_vport( . . . )
        ....
    }
    ....
}
```

The following sample code shows how to create, operate and delete a virtual port.

```
{
    int plib_vport_idx;
    dd_uint64_t my_wwpn, my_wwnn;
    dd_plib_scsitgt_port_info_t port_info;
    . . . .
    /* Create a virtual port with WWPN my_wwpn and
       WWNN my_wwnn on a physical port with PLIB
       port index 0 */
    plib_vport_idx=dd_plib_scsitgt_create_vport(0,
       my_wwpn, my_wwnn);
    if (plib_vport_idx <0) {
       /* Error */
    }
    . . . .
    /* Set the virtual port to target mode */
    if    (dd_plib_scsitgt_set_port_target_mode(plib_v-
       port_idx, 1, 0) <0) {
       /* Error */
    }
    . . . .
    /* Enable the virtual port */
    if    (dd_plib_scsitgt_set_port_state(plib_vport_idx,
       DD_PLIB_FC_PORT_ENABLE)<0) {
       /* Error */
    }
    . . . .
    /* Get port info of the virtual port */
    if    (dd_plib_scsitgt_get_port_info(plib_vport_idx,
       &port_info) <0) {
       /* Error */
    }
    . . . .
    /* Delete the virtual port */
    if ib_scsitgt_delete_vport(plib_vport_idx)<0) {(dd_pl /*
       Error */
    }
    . . . .
}
```

The following sample code shows how to get the number of virtual ports currently present on the system and to get port info of all the virtual ports.

```
{
        dd_uint32_t num_vports, num_vports_now;
        dd_plib_scsitgt_port_info_t *port_info;
        ...
        num_vports = dd_plib_scsitgt_get_num_vports( );
        if (num_vports > 0) {
             port_info =
dd_malloc((sizeof(dd_plib_scsitgt_port_info_t) * num_vports), ...);
             if (dd_plib_scsitgt_get_vport_info(port_ info,
num_vports, &num_vports_now) < 0) {
/* Error */
             }
             if (num_ports < num_vports_now) {
    /* There are more virtual ports now than when we queried.
     * port info contains "num_vports" entries.
     */
             if (num_ports > num_vports_now) {
    /* There are fewer virtual ports now than when we queried.
     * port_info contains "num_vports_now" entries.
         */
        ...
    }
  }
}
```

The following sample code to get port info of multiple virtual ports is not allowed because virtual port indexes in PLIB port table are not guaranteed to be contiguous (due to VPort delete request that could result in empty entry in the port table).

```
{
    dd_uint32_t num_vports;
    dd_plib_scsitgt_port_info_t port_info;
    . . . .
    num_vports=dd_plib_scsitgt_get_num_vports( );
    for (i=0; i<num_vports; i++) {
       rc=dd_plib_scsitgt_get_port_info(i, &port_info);
       . . . .
    }
    . . . .
}
```

In general, the PLIB does not use any network protocol, and does not store any persistent information to non-volatile storage. In an embodiment, the changes to the PLIB to accommodate NPIV features in Fibre Channel are used to enhance SCSI target endpoint functionality in a DD OS (or similar) data storage system.

SCSI Target Endpoint Enhancements

Embodiments are directed to providing enhancements to the SCSI target subsystem to take advantage of NPIV functionality on data domain restorer (DDR) systems, including endpoint flexibility and failover DD OS kernel drivers have added support for NPIV. This allows new functionality to be added to the overall SCSI target solution, including additional endpoint flexibility and the ability to perform endpoint failover between physical Fibre Channel ports. Certain use cases are identified for this functionality including: (1) simplifying multiple system consolidation, (2) endpoint failure to improve single-node availability, (3) port cost reduction, (4) system management isolation for multi-tenancy, and (5) facilitating migration to DDR from environments accustomed to more target ports.

Figure 4A:
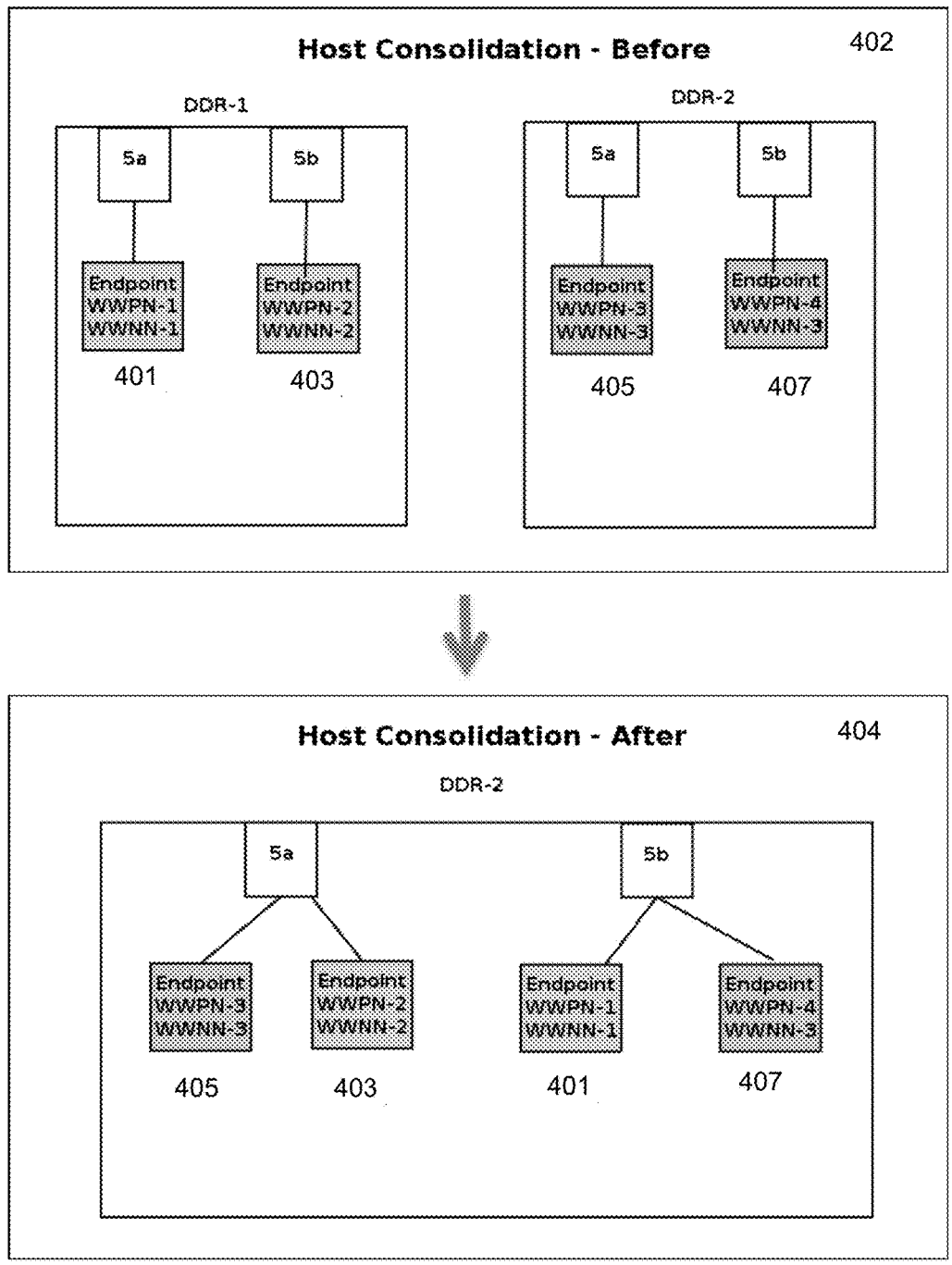
FIG. 4A illustrates an example of host consolidation using a SCSI target endpoint enhancement, under an embodiment.

With respect to system consolidation, multiple data domain restorer systems (DDRs) are consolidated into a single larger DDR, for example to reduce power usage or data-center footprint, or to improve de-duplication. To reduce the need to rezone or reconfigure existing initiators additional endpoints are configured on the consolidated system to provide equivalent access to the old discrete systems. FIG. 4A illustrates an example of host consolidation using a SCSI target endpoint enhancement, under an embodiment. Initially, there are two systems, DDR-1 and DDR-2, each with two Fibre Channel ports each with unique associated endpoints. Physical ports 5a and 5b on DDR-1 are associated with respective endpoints 401 and 403, and physical ports 5a and 5b on DDR-2 are associated with respective endpoints 405 and 407. These are then consolidated onto a single DDR (DDR-2) serving the same set of endpoints and WWPN/WWNN. Thus, as shown in FIG. 4A, DDR-2 has physical port 5a associated with endpoints 405 and 403 and port 5b associated with endpoints 401 and 407.

Figure 4B:
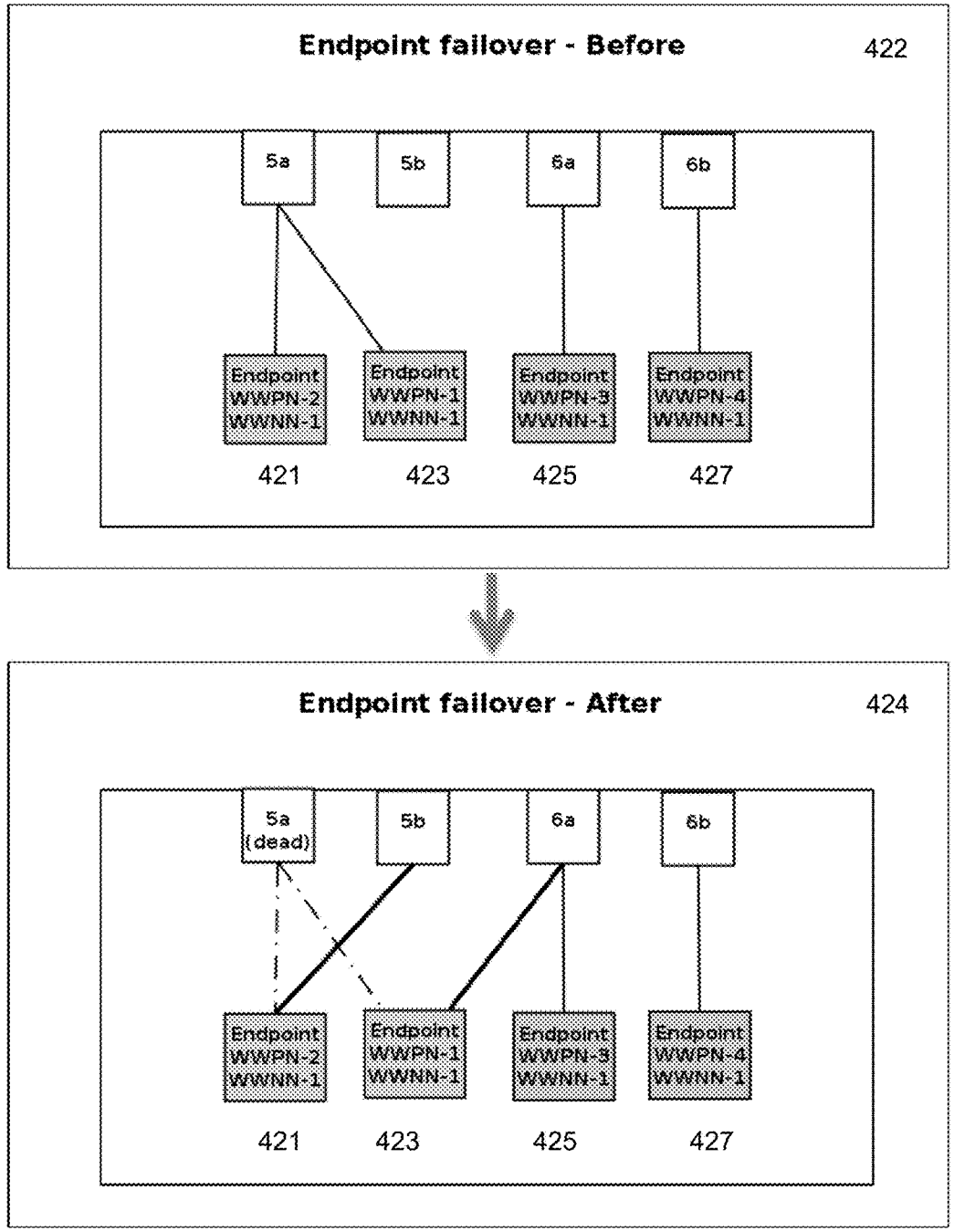
FIG. 4B illustrates an example of a typical endpoint configuration, with endpoints active on several different Fibre Channel interfaces, under an embodiment.

With respect to endpoint failover, endpoints are integrated with port failure/offline detection to failover endpoints to alternate ports in case of failure. This provides additional resilience for single-system DDRs. FIG. 4B illustrates an example of a typical endpoint configuration, with endpoints active on several different Fibre Channel interfaces. Block 422 illustrates an example state of the endpoints prior to failure in which port 5a is associated with ports 421 and 423, port 6a is associated with port 425, and port 6b is associated with port 427. If interface 5a now fails, each endpoint active on that interface may have a different failover destinations, in this case the two endpoint 421 migrates to interface 5b and endpoint 423 migrates to interface 6a and they continue to provide service, as shown in block 424.

With respect to port cost reduction, the use of multiple endpoints with fewer, higher capacity, physical interfaces reduces the cost of a DDR, or similar storage appliance. It also reduces the need for additional slots to be reserved for those interfaces. For example, instead of using 4, 2×8 Gb ports in a DDR 2, 2×16 Gb ports can be used, with eight endpoints assigned to the interfaces. This provides the same aggregate bandwidth and connectivity, yet reduces the system cost and slot usage.

With respect to system management isolation and multi-tenancy, multiple endpoints are used to isolate and compartmentalize access to a DDR (or other SAN) system from a management and access perspective. Consider an SMT (multi-tenant) system where it is desirable to allow tenants to manage aspects of their DDR SCSI Target access, but not interfere with other tenants. In this case the landlord could provision one or more endpoints for a tenant, then give the tenant the ability to configure the groups, devices and LUNs for that endpoint (this assumes the SCSI Target service allows corresponding separation for management). Note that multiple endpoints are a building block in the complete SMT solution for a SAN. Additional functionality would include (but not be limited to): allowing delegation of access groups to tenants, allowing delegation of device creation/deletion to tenants, and allowing delegation of SCSI Target service-specific features to tenants, for example create/delete of VTL tapes and importing/export VTL tapes from a tenant-specific tape pool to a tenant-specific VTL.

Figure 5A:
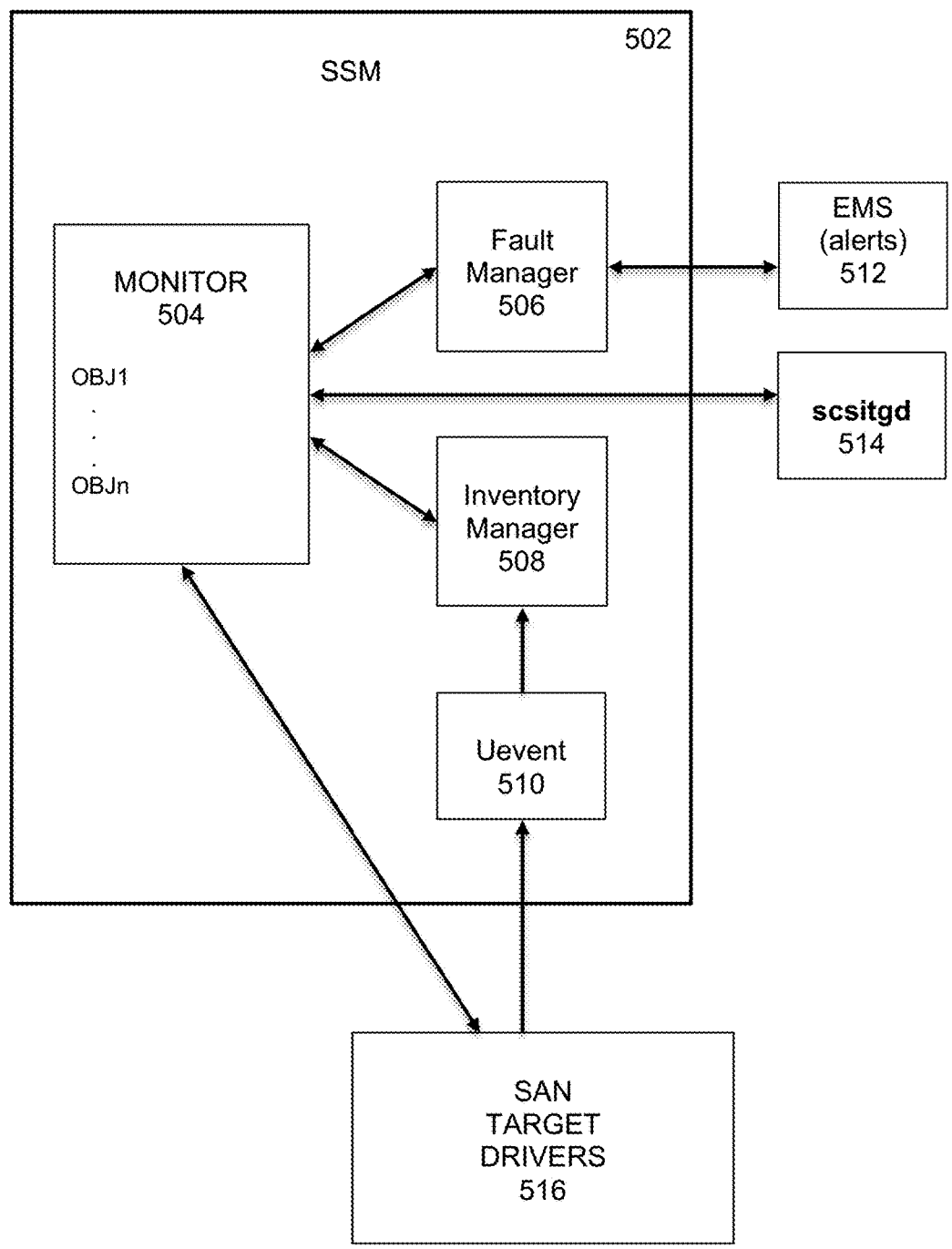
FIG. 5A illustrates a Fibre Channel Storage Subsystem Manager (SSM) configured to monitor target ports for failures, under some embodiments.

Embodiments also facilitate migration to the DDR environment from environments used to more target ports. DDR systems traditionally have a relatively low Fibre Channel port count when compared to comparable systems. By using multiple endpoints it becomes easier for new customers to migrate from environments where higher port counts are common. For example a system previously configured with 12 Fibre Channel ports may be configured with a DDR using 12 endpoints and a smaller number of physical interfaces. Embodiments support multiple SCSI Target endpoints on SCSI Target ports. That is, there may be a M:1 relationship between endpoints and ports. Endpoints can be added, deleted or migrated between ports as needed, either under administrator control or under direction of the single-node endpoint failover functionality. For the Fibre Channel transport this is supported on all topologies where NPIV is supported. For non-NPIV environments, scsitgtd continues to operate as previously, with a 1:1 relationship between an endpoint and its associated system address. The scsitgtd is a multi-threaded SCSI target daemon process that interfaces with the SSM monitor subsystem. As a daemon process, scsitgtd runs as a background task and not under direct control of a user interactive process. It comprises a management process that orchestrates the main functionality of the virtual/physical port management process 108, and sends commands to the operating system kernel to create NPIV ports as well as relevant configuration information. The scsitgtd also waits for critical or defined events related to failover/migration, or other events and then sends messages related to these events through the SSM monitor, as shown in FIG. 5A, described in greater detail below.

Under an embodiment, scsitgtd is enhanced as follows: (1) to support NPIV and non-NPIV (backwards compatible) modes; (2) to remove the current implicit 1:1 relationship between endpoints and transport system address; (3) enhance the scsitgtd transport subsystem to allow virtual port support; (4) enhance the scsitgtd Fibre Channel transport subsystem in use the new NPIV functionality supported by the kernel drivers (5) to detect and coordinate endpoint failover and failback when port failure occurs; (6) enhance the dd_scsitgtc API to allow utilization of the enhanced functionality; (7) enhance the SMS functionality and API to allow utilization of the enhanced functionality; and (8) enhance the DDR CLI functionality to allow utilization of the enhanced functionality.

Figure 4C:
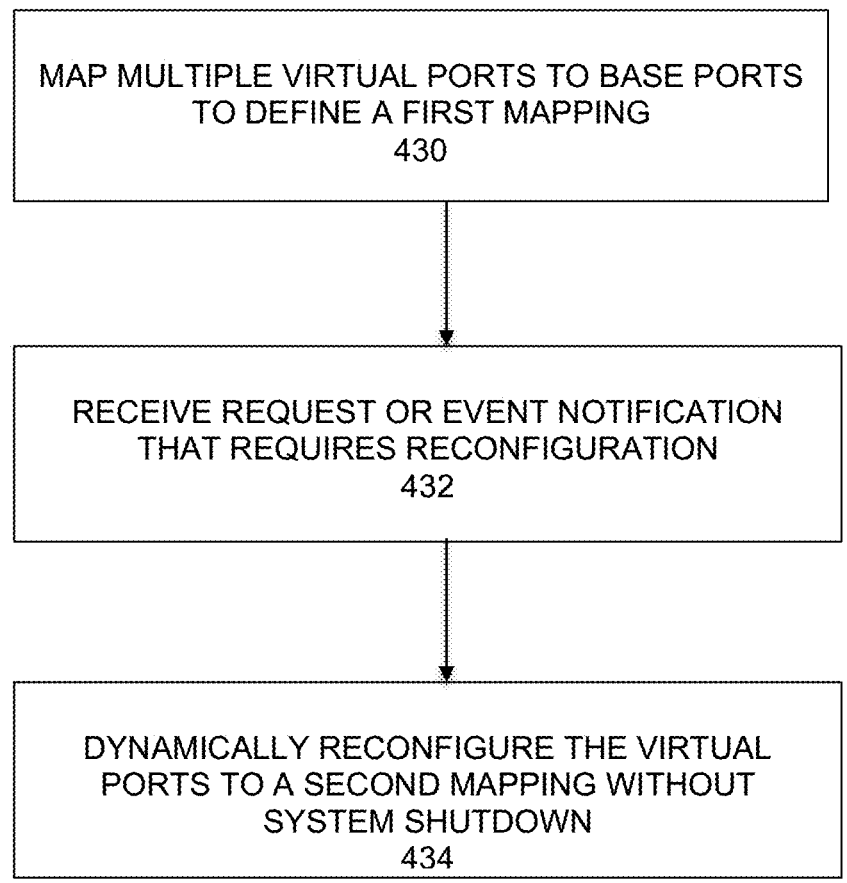
FIG. 4C is a flowchart that illustrates a method of performing dynamic reconfiguration of NPIV virtual ports in a Fibre Channel network, under some embodiments.

The endpoint mapping and scsitgtd SCSI target daemon process also facilitates the dynamic configuration of virtual ports within a storage system network to allow for non-disruptive migration of data or system reconfiguration. The FIG. 4C is a flowchart that illustrates a method of performing dynamic reconfiguration of NPIV virtual ports in a Fibre Channel network, under some embodiments. In general, the FIG. 4C illustrates a method of dynamically configuring NPIV virtual ports in a Fibre Channel SAN environment, coordinated with a user-space management daemon that performs NPIV to virtual endpoint mapping depending on events such as migration, failover and configuration. In block 430, the process maps a plurality of virtual ports to a single physical port (base port) to define a first mapping or configuration of NPIV virtual ports in the SAN. The system may then receiving a request or event notification that requires reconfiguration of the NPIV virtual ports with respect to assignment of these ports to specific base ports, block 432. The system then dynamically reconfigures the virtual ports from the first mapping to a second mapping by assigning the virtual ports to different base ports. The dynamic aspect means that reconfiguration is performed "on-the-fly" such as during runtime of data storage operations, and does not require shutdown of the system, as is done in the case of static reconfiguration. The request or event that caused the reconfiguration may be a data migration operation among devices in the storage system; a failover from a first data storage device to a second data storage device; a failback from the second storage device to the first storage device, or any other critical event that necessitates the transfer of data within or from the system. The data migration may be performed between two transport ports in a device of the storage system or between two storage subsystems each containing one or more storage devices of the storage system.

SCSI Target Port Definition

In general, a system-specific name used to identify a specific SCSI target transport interface. For the Fibre Channel transport the system address is the name of the HBA port used, e.g. 5a. The transport port is a base SCSI target component used to interact with transports. Each interface is identified by a system address. In general, each SCSI Target endpoint has a system address that identifies the transport layer entity used, for example with the Fibre Channel transport the system address refers to the Fibre Channel physical HBA/port, e.g. "5a", and for the iSCSI transport the system address refers to the iSCSI portal. This simple model is appropriate when there is a 1:1 relationship between endpoints and the underlying transport entity. Embodiments of the enhanced SCSI target endpoint system relax the 1:1 relationship and allows more operations and attributes to be associated with the underlying transport entity, which currently does not have a clear definition. Expanding the term "system address" to refer to the entire underlying transport entity was considered, however this leads to some awkward usage. For example, setting the topology for a system address is unnatural, it is not the system address that is having its topology set, it is the underlying transport entity.

To clarify the description, the term SCSI Target "transport port," or more simply just "port," is defined as the transport entity that endpoints associate with. Each port has a unique name, its system address, and the system address continues to be used as currently. For example, a port may have system address 5a. This interface has attributes, such as topology or link speed, depending upon the transport in use. Additionally, endpoints can be assigned to the interface using the system address 5a.

In an embodiment, the SCSI target Fibre Channel transport can be configured in either NPIV or non-NPIV mode. Non-NPIV mode may be equivalent to many systems' current functionality. It is intended for use in environments where NPIV is either not available or causes issues with the customer SAN. When NPIV is disabled only a single endpoint is allowed per transport system address, and the Fibre Channel base port is used to configure that endpoint to the SAN. Endpoint failover is disabled. Preferred embodiments may operate in NPIV, which allows multiple endpoints per interface, each using an NPIV port. In this case the Fibre Channel base port is used as a place-holder definition for the port and is not associated with an endpoint. A single global setting to enable NPIV support provides the simplest configuration for the customer. In addition, to meet the requirement for concurrent mixed-mode NPIV and non-NPIV operation, each port maintains its own value for NPIV enabled/disabled. This follows the global NPIV value by default, but may be disabled for specific interfaces if necessary by the administrator. For example, if a customer is using NPIV for most interfaces but wishes to use 5a with a legacy switch that does not support NPIV then the appropriate CLI configuration would be:

// Enable NPIV globally
ddsh# scsitarget transport option set npiv enabled
// Override the global value and disable NPIV for interface 5a:
ddsh# scsitarget interface modify 5a npiv disabled The npiv enabled option controls whether NPIV functionality can be used by the DDR, for example creating NPIV VPorts in a Fibre Channel SAN. Note: the low-level Fibre Channel subsystem always negotiates the underlying NPIV level in its standard Fibre Channel protocol negotiation. This behavior is unchanged from previous DDOS releases and is not controlled by this option. A system administrator may be responsible for setting the appropriate value for NPIV, or automatic runtime configuration of NPIV-compatible state may be provided.

The properties of a Fibre Channel interface base port change depending on whether or not NPIV mode is enabled, as outlined above. When NPIV mode is disabled the interface base port is configured as today, using the properties provides by the (single) endpoint along with any global properties for the port. For example, the WWPN for the base port is set to that of the endpoint, and the topology is set from the global interface information. When NPIV mode is enabled the interface base port is configured using a transport-specific set of properties derived from default values. For example, the desired default WWPN is associated with the "third WWPN default", as described in the architecture specification. These values are maintained persistently to allow consistent switching between NPIV and non-NPIV mode, and may also be changed by system administrators, if necessary. For non-HA systems the base port can be set to not register an address with the switch. This is similar to EDL operation, and reduces potential confusion when a WWPN is visible through the SAN but cannot be used for I/O. Note that for HA systems the base port is envisioned as being used as a "ping" port between two nodes of a failover pair, so must still be registered with the switch.

Embodiments allow the configuration and use of multiple endpoints per port. In present systems, scsitgtd discovers ports and automatically creates a single endpoint for each transport port. If a system address is removed, such as by removal of a SLIC, an endpoint can modified to use a different system address, or deleted entirely. The current implicit 1:1 relationship between endpoint and interface leads to most endpoint and transport level management being performed through the endpoint abstraction. With the ability to define multiple endpoints per interface, and the ability to more dynamically assign endpoints to different system addresses, certain enhanced functionality is provided, namely: (1) the ability to add new endpoints, with a given system address and other properties, is defined; (2) properties of endpoints and the properties associated with transport interfaces are clarified and updated as necessary (for example, a Fibre Channel port topology is a property of the port, not an endpoint, as such storage and management of the topology must move from the endpoint to the transport layer); (3) statistics and other monitoring is more clearly defined between the endpoint and each port (i.e., enable and disable of endpoints and ports is clarified and made discrete);

Embodiments also allow for multiple port instance support in scsitgtd transport layer. In present systems, the scsitgtd transport subsystem uses the concept of an abstract port. Each port is uniquely identified by a transport port id, or tpid (an integer value), along with attributes such as it's system address, its online status, as well as transport-specific attributes. Examples of transport-specific attributes include the link speed and firmware version for the Fibre Channel transport. The transport subsystem also associates host initiators (if any) with each transport port. It should be noted that transport ports are referred to as "interfaces." This reduces confusion with the term "port." With support for NPIV, the Fibre Channel transport port abstraction is changed because some attributes are appropriate associated with the physical port (e.g., firmware version, physical presence, link speed, etc.) whereas other attributes are associated with virtual ports (e.g., host initiators, WWPN, WWNN, fcp2-retry state). Note that if NPIV is disabled or not otherwise available then the default behavior is backwards-compatible, i.e., a single port is used. To support multiple instances of a physical port, the concept of multiple port instances is used. New instances of a port may be created, up to a system-defined limit. Each instance has a unique tpid, but has the same system address. In this case, each transport port always has an implicit base port instance. When an endpoint is associated with system address if the address allows multiple instances then the transport layer is called to request a new port instance, which returns a new tpid. This is then persistently associated with the instance until the endpoint is otherwise updated or deleted. The transport layer persistently records each port instance in the registry; this is an extension of the existing transport registry information, which describes each physical port. Transport port APIs are modified to allow the association between base port and its instances to be determined, as well as perform operations such as get statistics on a base port or port instance.

SCSI Target Endpoint Failover/Failback

Embodiments include mechanisms for managing endpoint failover/failback. Endpoints can be configured to perform failover, and optionally failback, when events associated with the underlying port occur. For example, if the port for an endpoint goes offline for an extended period the endpoint may be automatically failed over to a different, functioning, port by the system. This functionality is supported for Fibre Channel ports using NPIV through a storage subsystem manager (SSM) component, and other components or functional structures and elements. In an embodiment, the SSM monitors the target Fibre Channel port (e.g., HBA) for offline/online status, failure conditions, and/or marginal operation. When thresholds for offline/online, marginal or failure conditions are exceeded, it automatically sends alerts, and when it determines and identifies a port to be failed, it disables that port. Alerts are automatically cleared once the fault condition is cleared. A user-level interface may be provided via the OS or an alert subsystem to pass alerts and messages to the user.

FIG. 5A illustrates a Fibre Channel Storage Subsystem Manager (SSM) configured to monitor target ports for failures, under some embodiments. As shown in FIG. 5, SSM 502 includes a monitor 504 that tracks a number of objects (OBJ1 to OBJn) that are maintained by an inventory manager 508. Fault conditions are reported to a fault manager 506 that communicates with an EMS process 512 to transmit the appropriate alerts. In an embodiment, the SSM resides in the user-level layer and communicates with SAN target drivers 516 in the kernel layer through system functions and through a Uevent process 510 which receives Netlink-Socket (datagrams) from the drivers 516.

The primary function of SSM 502 is to monitor the target virtual or physical port for offline, failures or marginal conditions. Alerts are sent for failed and marginal ports through the EMS process 512. When a failed port is identified, that port is disabled by the FC target driver 516 and a notification is sent to scsitgtd 514. SSM 502 will also detect and send an alert when the Fibre Channel target HBA dumps its core. A firmware dump is considered a marginal condition and the port operational state would be set to marginal when this happens. Upon reboot, reloading of the FC target drivers, or when a failed port is enabled by a user space program, the port will resume the state prior to the failure detection. If the failure still exists, then the port operational status will change to failed and that port will be disabled. The SSM 502 will then reconcile the failure with existing alerts, only sending an alert if the failure is a new failure. If the failure is resolved, then the alert will be cleared. SSM 502 will also assume the port monitoring functions for port offline/online oscillations and conditions where an enabled port going offline triggers an alert. In an embodiment, the main functionalities managed or monitored by SSM 502 are: (1) hardware operational status (functional, marginal, failed, missing); (2) firmware dump status; (3) port oscillations and offline/online events; (4) detailed information relating to a port failure or marginal condition; and (5) alert settings and thresholds, though others are also possible.

As shown in FIG. 5A, the SSM 502 interfaces with the Fibre Channel HBA target driver stack 516 through netlink via SSM to obtain data and send alerts when required. The SSM 502 fault detection mechanisms reside within the target driver stack 516. An object (OBJ) in the monitor interfaces with the SSM fault manager 506 to reconcile, send, and clear alerts. The object may be a thread or could be a simple function callback that is spawned/executed once the existence of /sys/class/fc_host object is created. The object sends the settings via the SAN target driver. SSM 502 monitors the settings via netlink the SAN target driver and forwards appropriate events and/or changes to the SSM object. When a failed port is encountered, an alert will be sent to the user via SSM Fault Manager. Upon port failure, that port will be disabled and scsitgtd will be notified. Upon reboot, reloading of the FC target drivers, or when a failed port is enabled by scsitgtd, the port will resume the state prior to the failure detection. For example, if a port was enabled and subsequently that port is detected as failed, that port is disabled. If the system reboots, the failed port will resume an enabled state once the drivers are loaded. If the failure condition was not resolved while the system was down for reboot, the failure condition will once again be detected, the port disabled, and scsitgtd is notified. SSM 502 can detect when a failure condition is resolved and then automatically clear the associated alert. Certain operational parameters for SSM 502 operation can be defined. For example, SSM 502 will monitor all FC ports that are enabled. If an enabled port is offline for more than five minutes, an alert will be sent. Once that port is disabled or comes back online, the alert will be cleared. Port oscillations are also monitored with messages logged or alerts sent based on settings, such as to log a message when a port oscillation occurs. If an HBA is removed and there is an outstanding alert, the outstanding alert(s) will be cleared and the port operational status set to "missing". The scsitgtd daemon maintains the port state (enabled or disabled) and is to be notified of port state changes.

In an embodiment, endpoint failover using the SST monitor may be automatically enabled on ports that support it (e.g., for Fibre Channel ports with NPIV correctly enabled.) Additionally, only those endpoints with a secondary system address are candidates for failover. Each endpoint has a primary (home) system address, and Each endpoint has zero or more secondary (alternate) system addresses. Each endpoint may have a current (active) system address. The active system address may be the primary system address, a secondary system address or none if an endpoint is not currently mapped to a valid system address. On failure of a port, any endpoints that use the port as their current system address are candidates to failover to an alternate system address. Endpoints may be failed back to use their home system address when the underlying issue is resolved. The active, primary and secondary system addresses for each endpoint can be changed under administrative control. From a system perspective, scsitgtd receives notifications from the FC-SSM port monitor when Fibre Channel port related events occur, for example a port becoming online or offline, or changing its operational state. Events are immediately sent to scsitgtd, unlike the delay that is introduced for alerts raised by the Fibre Channel SSM. The SSM monitors the state of Fibre Channel ports and provides notifications to scsigtd of changes in state of ports.

For failover detection, scsitgtd performs failover processing based on event notifications from FC-SSM. Table 1 lists certain events that trigger failover, and whether such a failover is delayed or immediate.

TABLE 1

| EVENT | DELAY OR IMMEDIATE FAILOVER |
| --- | --- |
| Offline Port | Delay |
| Failed Port | Immediate |
| Administrative Endpoint Failure | Immediate |
| Failover on Port Disable | Immediate |
| Failover Requested | |

When an event is received from FC-SSM failover event, scsitgtd looks for endpoints currently associated with the port and queues endpoint failover events for subsequent processing. For a manual failover the administrator causes an immediate failover event to be queued for specified endpoints. Failover events may be immediate or delayed, as indicated in Table 1. A delayed failover waits a given timeout before performing the failover. The delay allows for a transient outage to be resolved without triggering failover. The timeout is an administrator configured option. For the case of delayed failover it is possible for the port state to change a second time before failover has occurred. For example, the port becomes online again. When scsitgtd receives such a notification from FC-SSM it will find and cancel any pending endpoint failovers for that port. For a manual failover the administrator may wait for completion of the operation.

Endpoint failover is executed by an independent agent in scsitgtd. This allows it to gather the appropriate resources to change the configuration. Note that performing failover may take significant time so it is not appropriate to perform it in the context of the FC-SSM notification; so the system is configured such that notifications are relatively lightweight. The execution agent runs both periodically, and also on demand if an immediate failover event occurs. The agent is responsible for handling queued endpoint failover events and executing them. During failover execution each endpoint that meets the criteria for failover is migrated to an alternate system address. The following general algorithm is used:

If endpoint should failover at this time then
    Find a new system address for the endpoint If new system address can be found
    then
        Disassociate endpoint from current system address instance Associate endpoint with failover system address instance Update group device entries for port bitmasks
    end
end
if error
    Leave endpoint unchanged, remove failover flag
else
    Update current endpoint configuration
End
Advise waiters of execution completion.

If failover is not possible the endpoint is left alone. This fits the general architectural goal where the system fails over when possible, but acknowledges that at a given point in time failover may not be possible. The new system address may include any of the system addresses associated with the endpoint that are enabled and online. This is discussed in more detail in the description below.

Part of failover processing determines the failover destination. In an embodiment, the system performs the following to determine the failover destination.

1. If the current address is the primary address search each address in the secondary address list for an online, normal port. For the first one found, use that for the new current address. Done 2. If the current address is a secondary address and there is more than one secondary address then search the secondary address list for an online, normal port that is not the current address. For the first one found, use that for the new current address. Done.

Note that currently there is no failover from secondary back to primary address. This may be configured by enabling automatic failback. Failing over to a marginal port may not possible during certain circumstances, such as if operation on a marginal port is preferable to no service. In other cases, it may be decided that no fail over is preferable. Optimization is also possible when multiple secondary port(s) are available, for example by examining the number of endpoints on each port, or looking at the current amount of activity on each port load balancing could be performed during failover.

While failover returns to a different address, failback is the operation of returning a failed-over endpoint to that endpoint's home system address. Depending upon administrative configuration this can happen automatically when a port has become online and is operating normally, or under manual control by an administrator. For automatic failback the failback delays for an administrator-defined interval before performing failback. This provides additional assurance that the restored port is operating correctly. Administrative (manual) failback is triggered by changing the in-use system address for an endpoint, or by successfully enabling an port and requesting failback of endpoints that have their home on the port and are currently failed over to another system address. In cases of administrative-requested failback no failback delay is applied. When a failback trigger occurs an endpoint failback event is queued for subsequent operation. For administrative failback the administrator may wait for completion of the operation.

Table 2 lists the three main ways for performing failback, and the operation characteristics of each.

TABLE 2

| EVENT | DELAY OR IMMEDIATE FAILOVER |
| --- | --- |
| Administrative failback of selected endpoints via scsitarget endpoint use | Finest control of failback; administrator controls location of each endpoint as primary or secondary port |
| Administrator enables a now functioning port and requests that any failed-over endpoints from that port failback to that port when it becomes available | Administrator controls when operation occurs; single step operation to recover system to normal operation |
| Automatic failback when system detects a port is operating normally after previous failover event | Hands-free operation of recovery from earlier failover. Has lowest level of control |

Endpoint failback is executed by an independent agent in scsitgtd. This allows it to gather the appropriate resources to change the configuration. Again, as noted above, because of time resources, notifications should be relatively lightweight.

The execution agent runs both periodically, and also on demand if an immediate failback event occurs. The agent is responsible for handling queued endpoint failback events and executing them. During failback execution each endpoint that meets the criteria for failback is migrated to its home system address. The following general algorithm is used for failback:

If endpoint should failback at this time
then
    Find home system address for the endpoint If home system address is available
    then
        Disassociate endpoint from current system address instance Associate endpoint with home system address instance Update group device entries for port bitmasks
    end
if error
    Leave endpoint unchanged else
        Update current endpoint configuration
    end
    Advise any waiters of execution completion.

In an embodiment, the algorithm embodies a failover policy that performs a failover operation based on factors such as primary port status (i.e., failure condition or administrator command) secondary port identity and availability, and other operating conditions (e.g., network traffic), operating performance (e.g., load balancing, optimum nodes, etc.), and other relevant characteristics. For example, the system may determine that endpoint E1 might move to secondary port P2 as it is listed as available, but the system may then notice that too much traffic is on port P2, and so may move to P3, the next secondary port on the list of available ports assigned for E1. Embodiments thus provide a method of facilitating failover of SCSI transport ports in a network by mapping a respective plurality of virtual endpoints to each of a plurality of physical ports, wherein each endpoint is an abstracted object having attributes that can be moved around the network, and upon triggering of a failover operation, re-mapping endpoints assigned to a primary physical port to a secondary physical port based on a defined policy and operating conditions. A particular virtual endpoint is assigned to a respective primary physical port and one or more secondary physical ports, and a list is maintained for each virtual endpoint defining the assigned respective primary physical port and the one or more secondary physical ports in order of selection priority or preference. Upon the triggering of the failover operation, the system re-assigns the particular virtual endpoint to an available secondary physical port. The available secondary physical port is determined according to a defined policy that may encapsulate at least part of the algorithm above including an identity and sequence of secondary port determined from the list, an availability of the port, wait times for initiation of the failover operation, and one or more operating and performance characteristics of the network, where the operating and performance characteristics comprise amount of network traffic to the available secondary physical port, network load imposed on the available secondary port, and reliability of the available secondary port, and other factors. The triggering of the failover operation can be initiated by one of a port failure condition or an administrative command to disable the primary physical port.

Figure 5B:
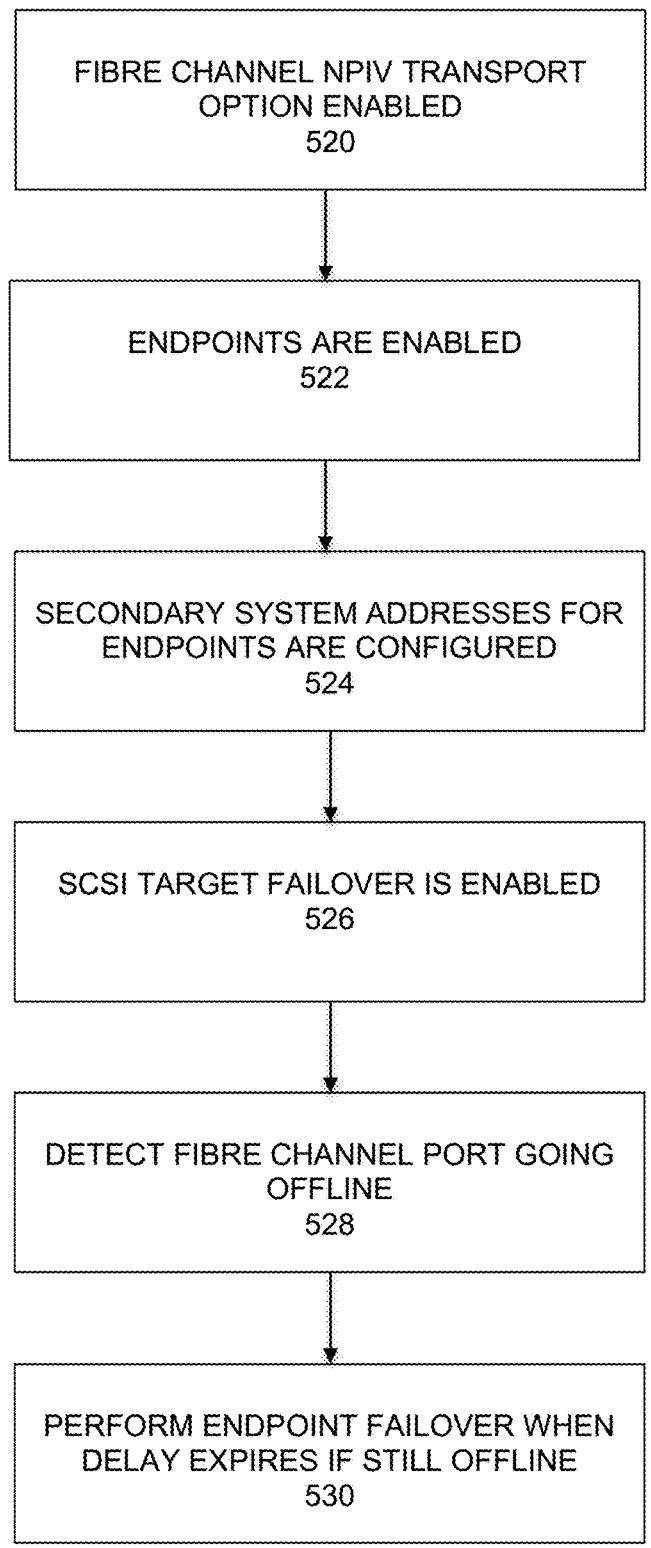
FIG. 5B is a flow chart that illustrates a method of performing port failover, under some embodiments.

FIG. 5B is a flow chart that illustrates a method of performing endpoint failover configuration and subsequent triggering of failover on a Fibre Channel port, under an embodiment. In block 520, the Fibre Channel NPIV transport option is enabled. This causes the Fibre Channel transport subsystem to be reconfigured to use NPIV and multiple endpoints per interface. Endpoints are enabled in block 522. This causes the endpoint subsystem to transition the endpoints to enabled/online, and passes the corresponding information to the transport layer to ensure the ports are also enabled and online. In block 524, the user (or system) configures secondary system-addresses for endpoints that will be used with endpoint failover. This updates the endpoint configuration, and the scsitgtd registry. In block 526, the user (or system) enables SCSI Target failover. The updates the endpoint failover monitor system to become ready to handle endpoint failover events. In the event that a Fibre Channel port goes offline, this is detected by FC-SSM which sends a notification to scsitgtd, block 528. This notification starts a delayed endpoint failover for endpoints associated with the interface. When the failover delay expires, if the interface is still offline then the failover executor performs endpoint failover, block 530. This updates the current system address for each applicable endpoint to a secondary system address, and then calls the scsitgtd transport layer to modify tpid properties of the transport port instance to use the new secondary address.

Further description and illustration of the failover method and system are provided below with reference to FIGS. 6 to 9.

Updating Group Device Port Bitmasks

Devices are visible to specific host initiators, on specific Fibre Channel ports. In an embodiment, the mapping is managed in the kernel by SCST access groups. Each device in an access group has a port bitmask associated with it, providing the definition for which ports that device is visible on. The port bitmask includes NPIV virtual ports. Thus, when executing failover/failback or migrating an endpoint from one port to another in an NPIV environment it is necessary to update the port bitmask information in SCST. If there are many devices this may take a significant amount of time, which could adversely affect the overall failover/failback time. To address this a new kernel SCST port is added that allows batch updating of the port bitmasks for devices in groups.

A detailed API and description for Endpoint Failover/Failback/Migration is provided as Appendix 1 attached hereto.

API, Data Structure, and Registry Changes

In an embodiment, certain APIs may also be changed or added. One such API is the dd_scsitgtc_interface_show( ) API, which is added to show detailed interface information, similar to the existing dd_scsitgt_endpoint_show( ) API for endpoints. The dd_scsitgtc_interface_show_free( ) is used to free the allocated results of a show operation.

The scsitgtd transport API provides a port to the transport subsystem within scsitgtd. scsitgtd_transport_list_ports. The existing scsitgtd_transport_list_ports( ) API lists ports by name (i.e., system address). This API is modified to return the names of base ports. The scsitgtd_transport_list_port_ids lists all transports matching a given criteria.

The existing scsitgtd_transport_port_get_initiator_info API returns initiators visible on a given port by name (system address). This is no longer appropriate. This is replaced the API scsitgtd_transport_port_get_initiator_info_by_id which returns initiators visible on a given transport port instance. The existing scsitgtd_transport_port_name_resolve API looks up a transport port by one or more names (system address). It is modified to return the base port if a system address is given, or a port instance if a more specific name is given. The existing scsitgtd_transport_port_get_info API gets information for a port by system address. This is modified to return the information for the base port matching the system address, if any.

The existing scsitgtd_transport_option_set API sets transport option; it is modified to allow the new option npiv, to enable or disable NPIV support. The existing scsitgtd_transport_option_reset API resets transport options, and is modified to allow the new option npiv, to enable or disable NPIV support. The existing scsitgtd_transport_option_show API sets transport options, and is modified to show the new option npiv, showing whether NPIV support is enabled or not. The existing scsitgtd_transport_port_set_options API sets individual port options, and is modified so that port options that only apply to base port, e.g. port topology, can only be applied to base ports.

The scsitgtd_transport_port_instance_add API requests the transport subsystem to create a new port instance, and associate a port id with it. The scsitgtd_transport_port_instance_delete API requests the transport subsystem to delete an existing port instance. The existing scsitgtd_transport_show_stats API shows detailed statistics for a given list of endpoints, organized by endpoint. This is modified to return detailed statistics for a list for transport system addresses, with filtering by system address.

Under an embodiment, certain defined data structures are also modified, including: dd_scsitgtc data structures. The dd_scsitgtd_transport_stats_filter_t data structure is used to restrict transport statistics to selected transports and/or system addresses. It is similar to the existing endpoint-oriented dd_scsitgtd_stats_filter. The existing dd_scsitgtd_transport_stats_t data structure is used to return detailed transport port information. It is currently organized by endpoint, which is inappropriate. The dd_scsitgtc_interface_info_t data structure describes a single interface in detail. The existing dd_scsitgtd_endpoint_info_t data structure describes an endpoint, and is updated to reflect the separation between endpoint and port.

Certain scsitgtd RPC data structures are also updated. The scsitgtd_transport_stats_filter_t data structure is added to filter scsitgtd statistics requests. It is used for RPCs that return transport oriented detailed statistics. The existing scsitgtd_transport_stats_t data structure is used to return detailed transport port statistics. Currently this returns a scsitgtd_endpoint_stats_t array, which is inappropriate. The structure is changed as follows. The existing scsitgtd_transport_port_info_t structure describes a given port. This is modified to allow for multiple port instances:

typedef struct {
. . . .
dd_bool_t base_port; // TRUE if this
is a base port instance dd_uint32_t
max_instances; // Maximum
number of instances supported dd_uint32_t
current_instances // Current
number of instances
scsitgtd_id_t    instances[SCSITGTD_MAX_PORT_INSTANCES]; // Current instance ids
} scsitgtd_transport_port_info_t;

In an embodiment, certain registry structures are also modified. For example, the existing scsitgtd.transport registry namespace contains information about SCSI Target transports and associated configuration (e.g. transport options, ports, etc.) is modified. Likewise, the existing scsitgtd.endpoint registry namespace contains information about SCSI Target endpoints, and a new scsitgtd.option registry namespace that contains global scsitgtd options is added.

Fibre Channel Port Failover

Embodiments include a port failover feature on the DDR system that allows for automatic failover in the event of port failover that uses the NPIV techniques described herein. An NPIV (virtual) port is created on a physical port and assigned with a fixed WWPN. The virtual port is an endpoint that DDR LUN (logical unit number) devices can be accessed through. If the physical port fails, then the virtual port will be removed from the failed physical port and recreated on the designated physical port (failover port) with the same WWPN. DDR LUN devices will remain available through the same endpoint which is now a virtual port on the failover port. A physical link failure is monitored by a user space process and failover can be triggered automatically when failure is detected.

The port failover feature can be used as a basis for multi-node failover strategies in high availability systems. It can be used to increase LUN availability on DDR systems. Access to DDR LUNs will remain available against link failure that could be a result of HBA failure, port failure or other hardware failures such as failed SFP, bad cables/connections, etc.

As defined above, an endpoint is a named generalization of a transport, a specific name in SCSI Target, and is used to expose SCSI Target devices based on SCSI Target access groups; an NPIV is a Fibre Channel technology that allows multiple N_Port IDs to share a single physical N_Port where each N_Port has a unique identity (WWPN) on the SAN; a base port is a port that always exists within a physical port, and as one-to-one mapping with physical port. A base port is assigned a unique WWPN which is used by HBA Firmware to perform fabric login. When port failover feature is disabled, the base port serves as an endpoint. When it is enabled, a base port does not serve as an endpoint and it is only used to monitor physical link state. A virtual port is an NPIV port created on a physical port, and one physical port can have multiple virtual ports. When created, a virtual port is assigned a unique WWPN which is used by HBA Firmware to perform FDISC login. When port failover feature is enabled, virtual port serves as an endpoint. When port failover is enabled, a port is considered failed when it experiences a link failure. A link failure is a state when the link goes down and remains down for a specified (wait_time) period. A link failure can result from HBA failure, physical port failure or other hardware failures such as failed SFP, bad cable, etc. Link failure due to HBA port being explicitly disabled is not considered as a failed port.

In the event of a failure condition caused by a failed port, a defined failover policy is executed. The SCSI Target shall initiate the failover process, which is triggered by a failed port. In an embodiment, the endpoint on the failed port shall fail over to its failover port if failover port is defined. The failover port is the designated physical port(s) where an endpoint will fail over if the original physical port (primary system address) fails. The failover port may be system or user defined as a failover system address. It is set per endpoint basis. In an implementation, the default failover port is set to none for each endpoint which means the endpoint will not fail over on failure. The Failover port could take a list of system addresses. The order within the list reflects the sequence of physical ports which endpoint will fail over to. When the primary system address fails, the endpoint will fail over to the first available system address by following the sequence in the list. If later the failover system address also fails, then the endpoint will fail over to the next available address defined in the list. Once the last system address in the list is reached, the search will circle back to the beginning of the list. If none of the system addresses in the failover list is available, then the endpoint will be declared offline. The endpoint shall fail over based on its set method, which can be automatic or manual and system or user-configurable and set per endpoint basis. By default failover method is set to automatic, which means if failover port is defined, then the endpoint will automatically fail over to the failover port on failure.

In a failback situation, an endpoint will always fail back to its original physical port or primary system address. The failback method can be automatic or manual, and system or user-configurable and set per endpoint basis. By default failback method is set to manual which means user will manually perform failback operation on an endpoint to its original physical port once issue on the original port is resolved. If failback method is set to automatic, endpoint will fail back once link on the primary physical port comes up and remains up after the defined wait time period, which allows the link to achieve stability.

Several driver interfaces can be defined to implement failover and failback functionality according to embodiments. Illustrative driver and PLIB interfaces include:

| Driver Interfaces | |
|---|---|
| /proc/scsi_tgt/q1a2x00tgt/mgmt | Create and delete virtual port |
| /sys/class/scsi_host/hostX/npiv_support | Check if NPIV is supported on a specific port |
| /sys/class/scsi_host/hostX/is_vport | Check if a port is a virtual port or a base port |
| PLIB Interfaces | |
| dd_plib_scsitgt_create_vport( ) | Create virtual port |
| dd_plib_scsitgt_del_vport( ) | Delete virtual port |

Figure 6:
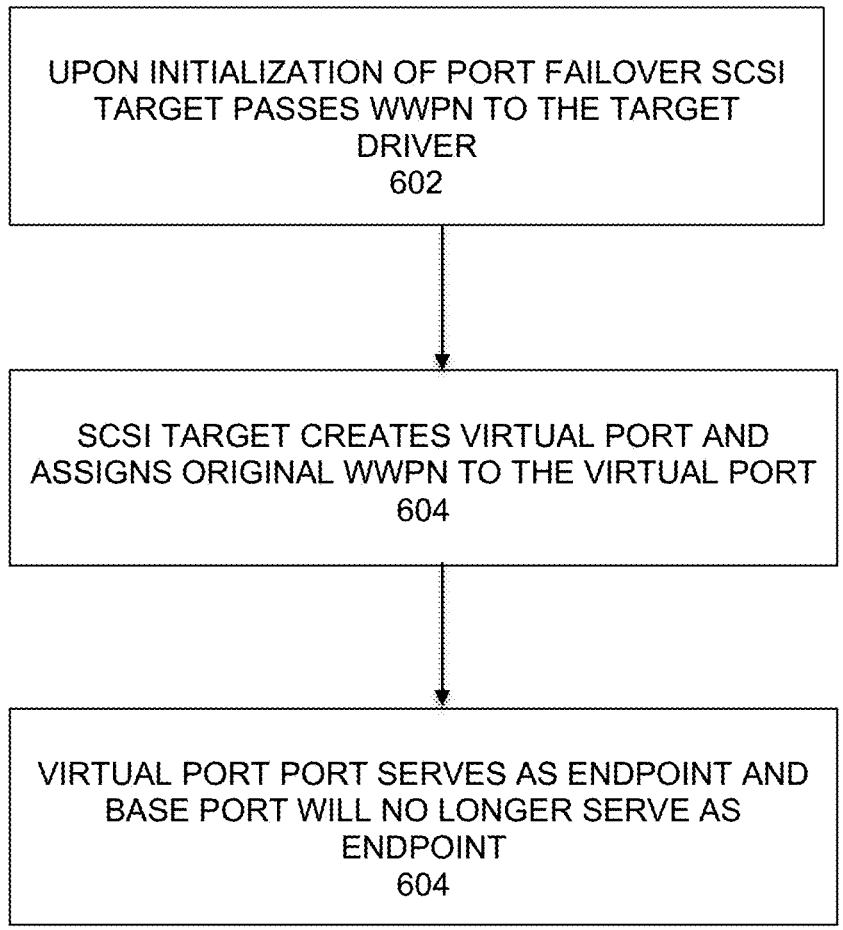
FIG. 6 illustrates a method implemented port failover, under an embodiment.

In a specific implementation the failover/failback functionality may be implemented as a feature that can be enabled/disabled by the user. In such a case, upon a new installation or system upgrade, the port failover feature may be disabled by default. FIG. 6 illustrates a method implemented port failover, under an embodiment. As shown in block 602, at initialization time SCSI Target passes a WWPN to the target driver. The WWPN is to be used by HBA firmware to perform fabric login for the base port. When port failover is disabled, the base port with a WWPN serves as an endpoint; and when port failover is enabled, SCSI Target shall get the reserved WWPN and assign it to the base port. The SCSI target then creates a virtual port and assigns the original WWPN (the WWPN previously assigned to the base port) to the virtual port, block 604. One virtual port is created per physical port, and the virtual port now serves as the endpoint, while the base port no longer serves as an endpoint, block 606. This preserves the endpoint to WWPN mapping while supporting port failover.

Figure 7:
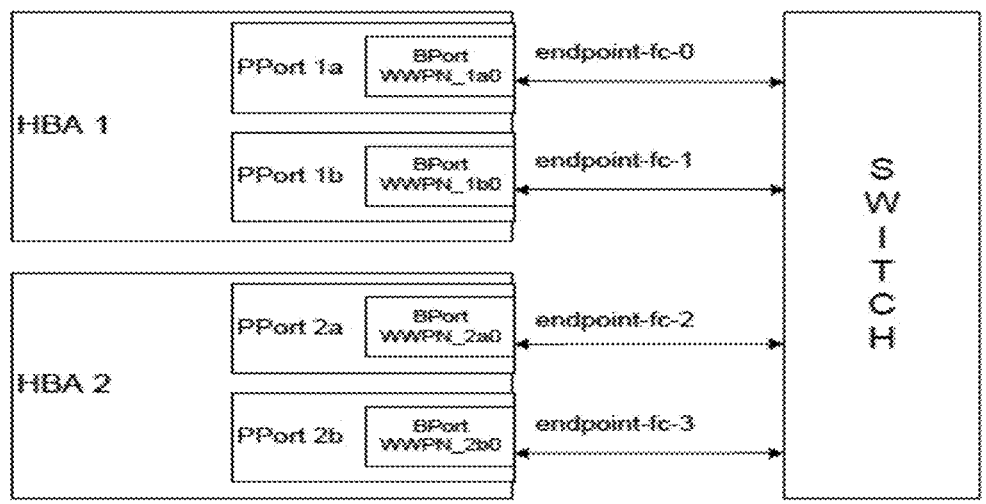
FIG. 7 illustrates an example port layout before and after failover functionality is enabled.
Figure 7:
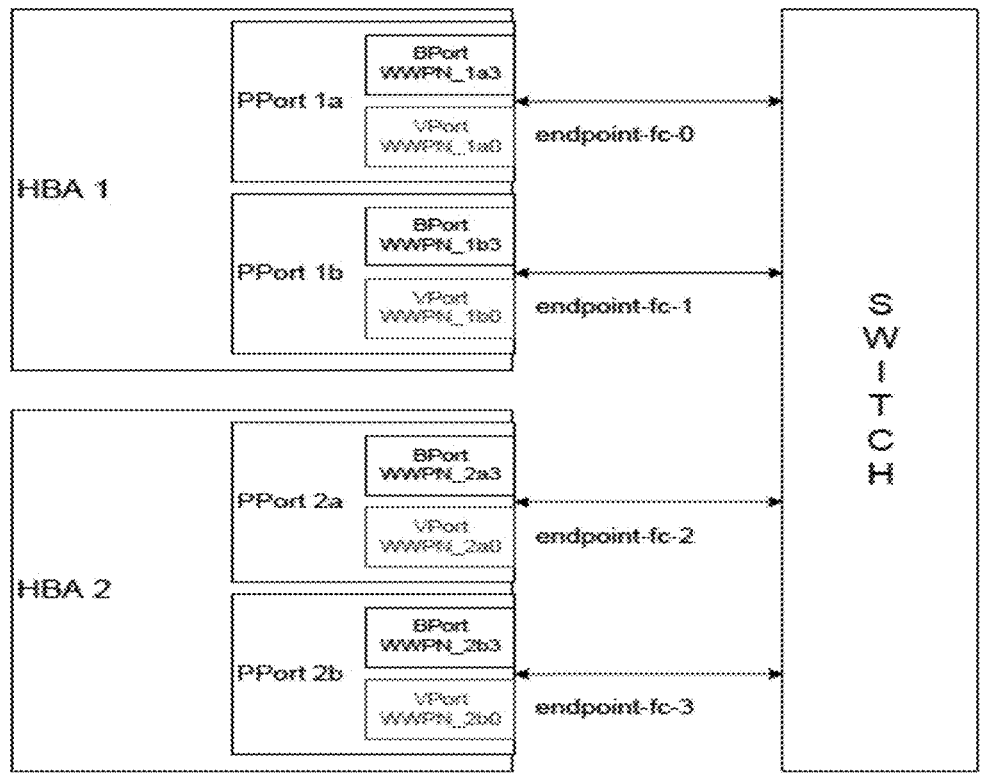
Figure 8A:
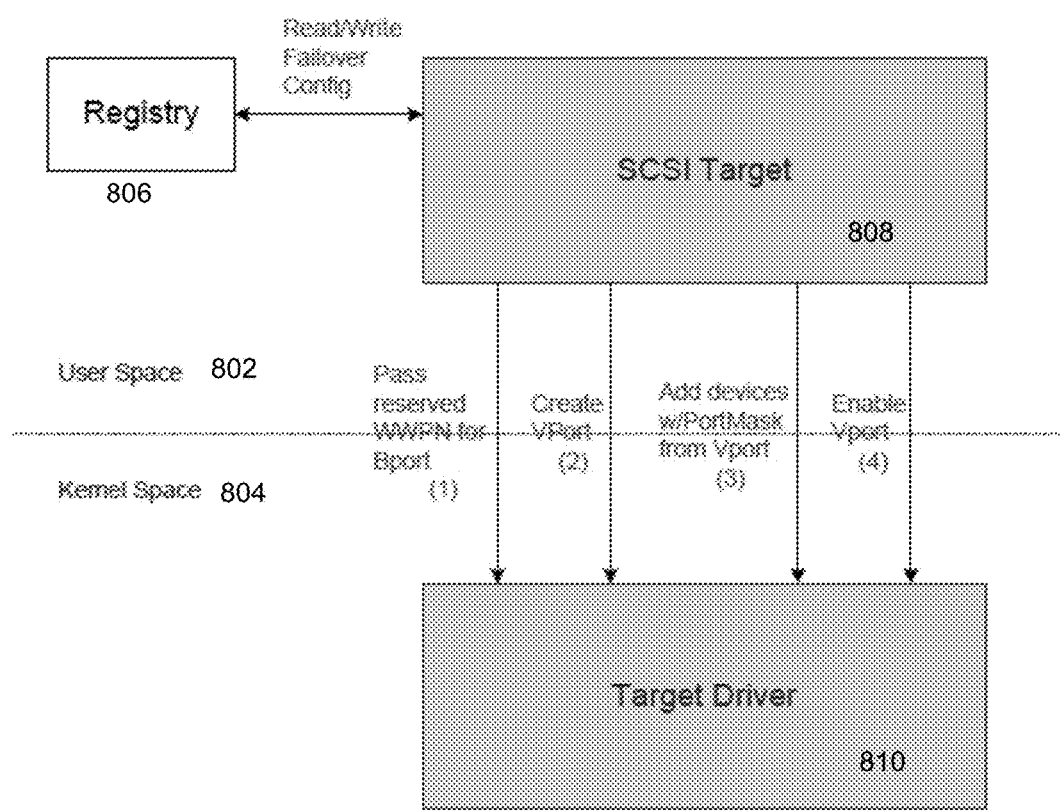
FIG. 8A illustrates the interaction between the user space and the kernel space during initialization port failover, under an embodiment.

FIG. 7 illustrates an example port layout before and after failover functionality is enabled. As shown in FIG. 7, in the state 702 before failover is enabled, HBA 1 and HBA 2 each have two physical ports (PPort 1a/1b, and PPort 2a/2b, respectively). Each physical port (PPort) has a corresponding base port (BPort) with a unique WWPN number. These are assigned as individual endpoints, e.g., endpoint-fc-0 and endpoint-fc-1 for HBA 1 and endpoint-fc-2 and endpoint-fc-3 for HBA 2. After failover is enabled, as shown in state 704 of FIG. 7, virtual ports (VPorts) are created within each PPort. Thus, the defined endpoints now refer to both a corresponding base port and a virtual port. With respect to specific implementation details in an embodiment, just like a physical (base) port, each virtual port also has a scsi_host entry and an fc_host entry in /sys/class. Each port (base or virtual) has a unique id which is available at /sys/class/scsi_host/hostX/unique_id. The id is used by SCSI target to compute PortMask per device in a group. The PortMask is used by Target Driver to determine from which port(s) a device can be accessed through. After a virtual port is created, the endpoint is now served by the virtual port. The SCSI target shall builds PortMask using the unique id of the virtual port and add devices to a group. After all devices have been added, the SCSI target enables the virtual port. Because removing and adding LUN devices with updated PortMask can be a costly operation, a kernel interface may be used to perform a batch operation or update for all operations to make the updating process more efficient. FIG. 8A illustrates the interaction between the user space 802 and the kernel space 804 during initialization port failover, under an embodiment. As shown in FIG. 8A, registry 806 transmits failover configuration information to the SCSI target 808. The SCSI target 808 in user space 802 then passes to the target driver 810 in kernel space 804 information and commands such as the WWPN for the base port, create VPort, add devices from the VPort and enable the VPort.

Figure 8B:
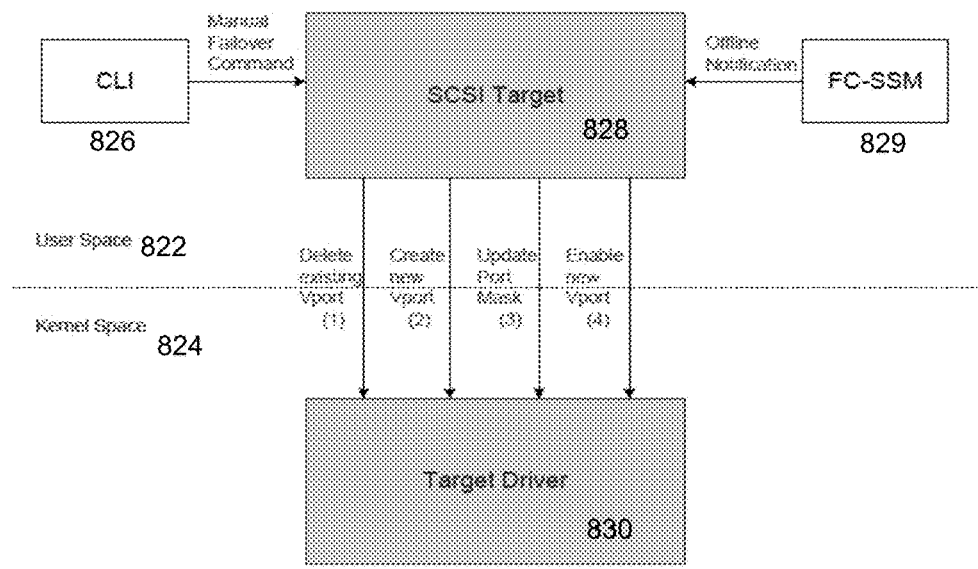
FIG. 8B illustrates the interaction between the user space and the kernel space during failover, under an embodiment.

With respect to failover operations, upon port failover the SCSI target will receive asynchronous offline notification from the SSM if the physical link goes down. If failover method is set to automatic, then the SCSI target will monitor for link failure condition per endpoint. A link is failed when it remains down for a specified wait time period which is set per endpoint. The wait time period may be set to any appropriate length of time, such as one minute but other time periods are also possible. If failover port is defined and link failure condition is satisfied for an endpoint, then the SCSI target shall initiate endpoint failover. In an embodiment, a failover condition can also be triggered manually by user with a failover command line interface command. To perform the failover operation, the SCSI target first deletes the virtual port of the endpoint from its primary physical port and then creates a new virtual port with the same WWPN on the failover port. The newly created virtual port on the failover port will serve the same endpoint and it will be assigned a new unique id. PortMask of LUN devices accessed through the affected endpoint shall be updated with a new value computed from the new unique id. After PortMask is updated, the SCSI Target shall enable the new virtual port. FIG. 8B illustrates the interaction between the user space 822 and the kernel space 824 during failover, under an embodiment. As shown in FIG. 8B, a command line interface 826 transmits a manual failover command to the SCSI target 828, and the SSM 829 sends an offline notification to the SCSI target 828. The SCSI target 828 in user space 822 then passes to the target driver 830 in kernel space 824 commands to delete the existing VPort, create a new VPort, update the port mask, and enable the new VPort.

Figure 8C:
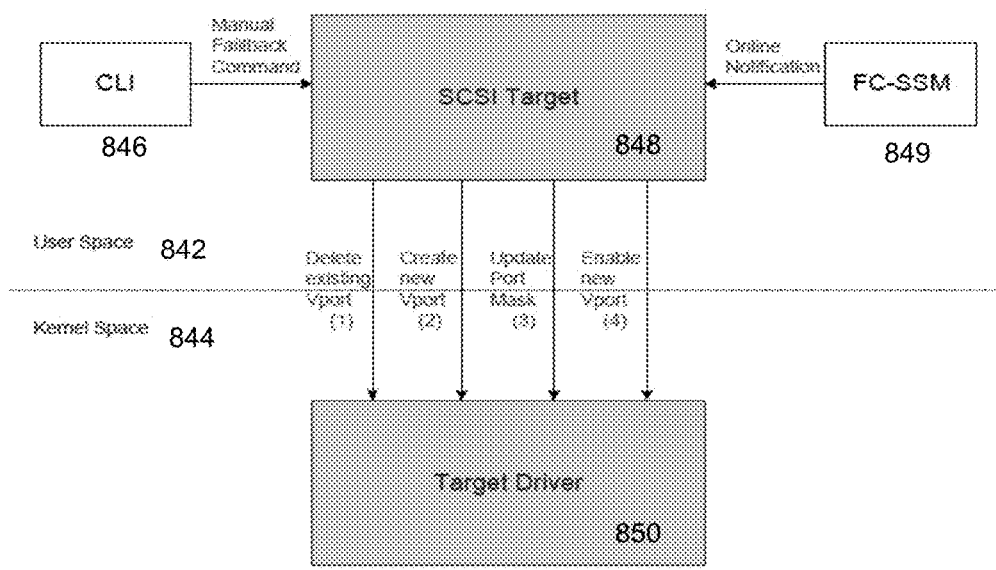
FIG. 8C illustrates the interaction between the user space and the kernel space during initialization port failback, under an embodiment.

With respect to failback operation, the system may be implemented such that manual failback is the default failback method. When set to manual, it requires user to perform a failback command once issue with the primary physical port has been resolved. If failback method is set to automatic, once SCSI target receives primary physical port online notification from the SSM, it will wait for a wait time period. If the primary physical port remains online after this period, the SCSI target will initiate a failback. For this case, the wait time period may be set to five minutes or some similar time period. To perform a failback operation, the SCSI target will delete the virtual port on the failover port and then create a new virtual port with the same WWPN on the primary physical port. The unique id of the new virtual port on the primary physical port may be different from the unique id prior to the failover. The PortMask of LUN devices accessed through the affected endpoint will again need to be updated with the new unique id. After it is updated, the SCSI target will enable the new port. FIG. 8B illustrates the interaction between the user space 842 and the kernel space 844 during initialization port failback, under an embodiment. As shown in FIG. 8C, a command line interface 846 transmits a manual failback command to the SCSI target 848, and the SSM 849 sends an online notification to the SCSI target 848. The SCSI target 848 in user space 842 then passes to the target driver 850 in kernel space 844 commands to delete the existing VPort, create a new VPort, update the port mask, and enable the new VPort.

Figure 9:
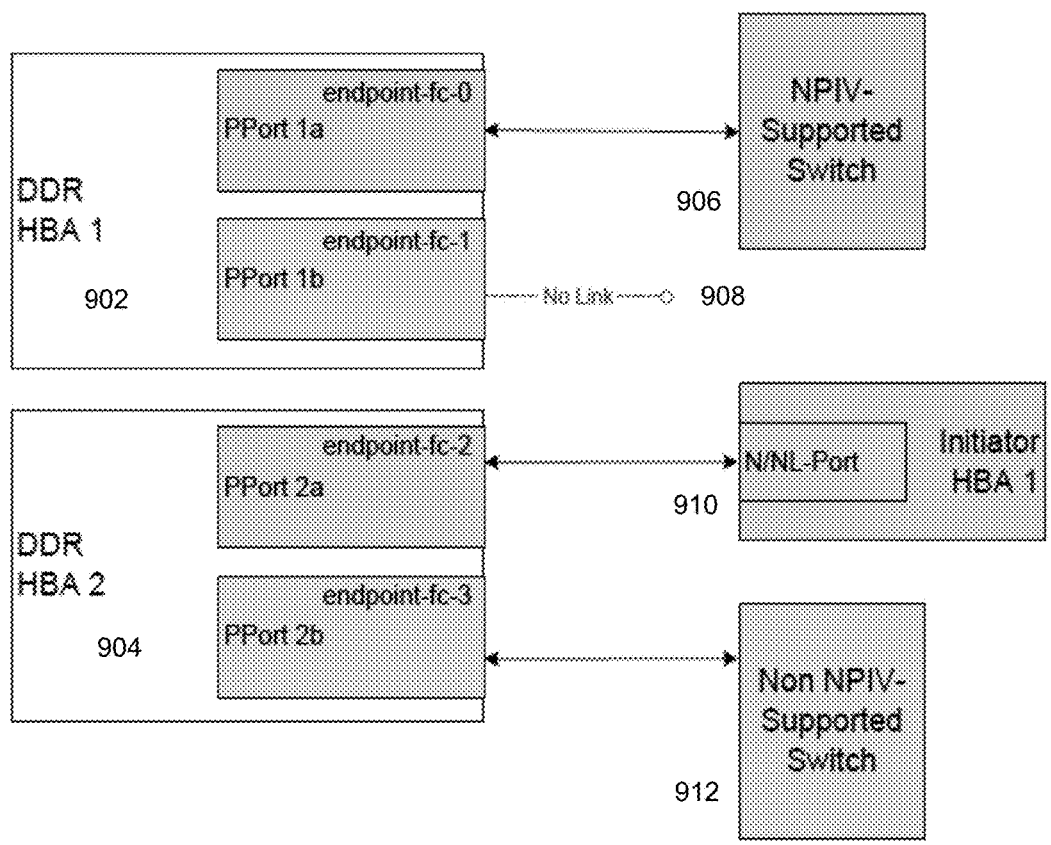
FIG. 9 illustrates different configurations that can apply port failover in some example embodiments.

In an embodiment, the port failover feature can be enabled and configured in any configuration or topology, but in general, the feature is only functional on physical ports that are connected to an NPIV-supported switch, and has no effect on physical ports that are not connected to an NPIV-supported switch. FIG. 9 illustrates different configurations that can apply port failover in some example embodiments. As shown in FIG. 9, port failover can be enabled and configured for any combination of the following configurations: (1) one or more or all physical ports on the HBAs 902 and 904 are connected to an NPIV-supported switch 906; one or more or all physical ports are disconnected (no link) 908; (3) one or more or all physical ports are directly connected to initiator ports 910 in point-to-point topology or loop topology; and (4) one or more or all physical ports are connected to non NPIV-supported switch 912. Thus, the switch component shown in FIG. 7 is typically an NPIV-supported switch, but may also be a non NPIV-supported switch depending on system configuration.

Figure 10:
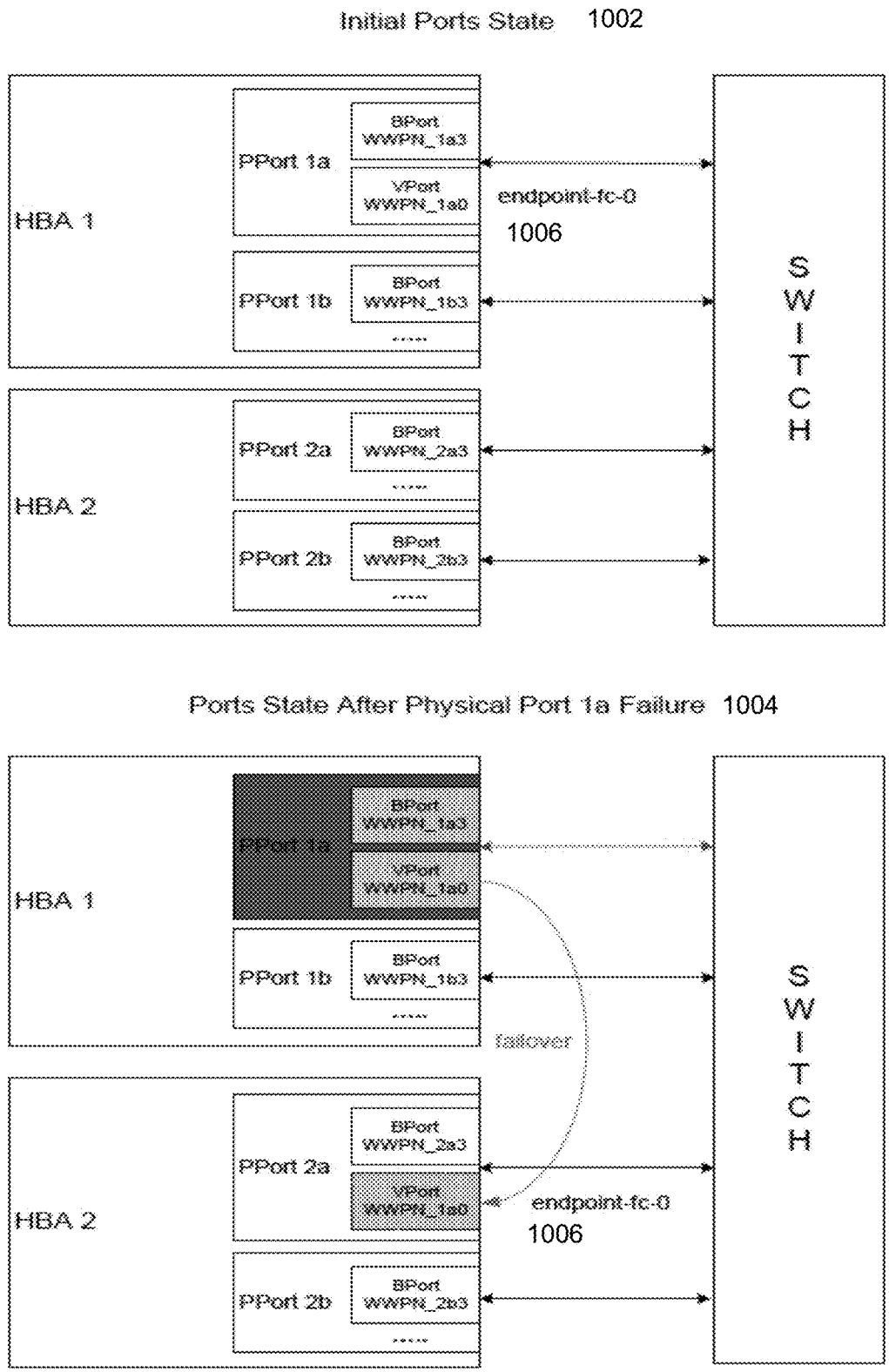
FIG. 10 illustrates a remapping of virtual ports from an initial port state to a second port state after a failure condition, under an embodiment.

The failover method described herein, in conjunction with the SCSI target endpoint and NPIV definitions and SSM operation allow SCSI target virtual endpoints to be dynamically created, deleted and managed during failover, migration, and deletion operations in a backup storage appliance without incurring disruption of other virtual endpoints on the same appliance. In this way, dynamic management of SCSI target virtual endpoints provides maximum flexibility without incurring disruption to other virtual endpoints during failover or exception events. This is accomplished at least in part through a mechanism that maintains the same WWPN address for a virtual port after it is re-mapped from a first port to a second port. FIG. 10 illustrates a remapping of virtual ports from an initial port state 1002 to a second port state 1004 after a failure condition, under an embodiment. As shown in FIG. 10, virtual port (VPort) 1006 is first mapped to physical port (PPort) 1a of HBA 1 during an initial port state 1002. As an example, it is assigned WWPN number WWPN_1a0, and represents endpoint-fc-0. In the event of a failure condition of PPort 1a, virtual port 1006 is re-mapped to another physical port, such as PPort 2a in HBA 2. Virtual port 1006 maintains its same WWPN number and its representation as endpoint-fc-0 despite being associated with an entirely different physical port in a different device (i.e., HBA 2). The dynamic aspect of the management process means that it can occur anytime during system operation, such as when backup operations are underway, and can be performed without disrupting other work or processes of the system.

Figure 11:
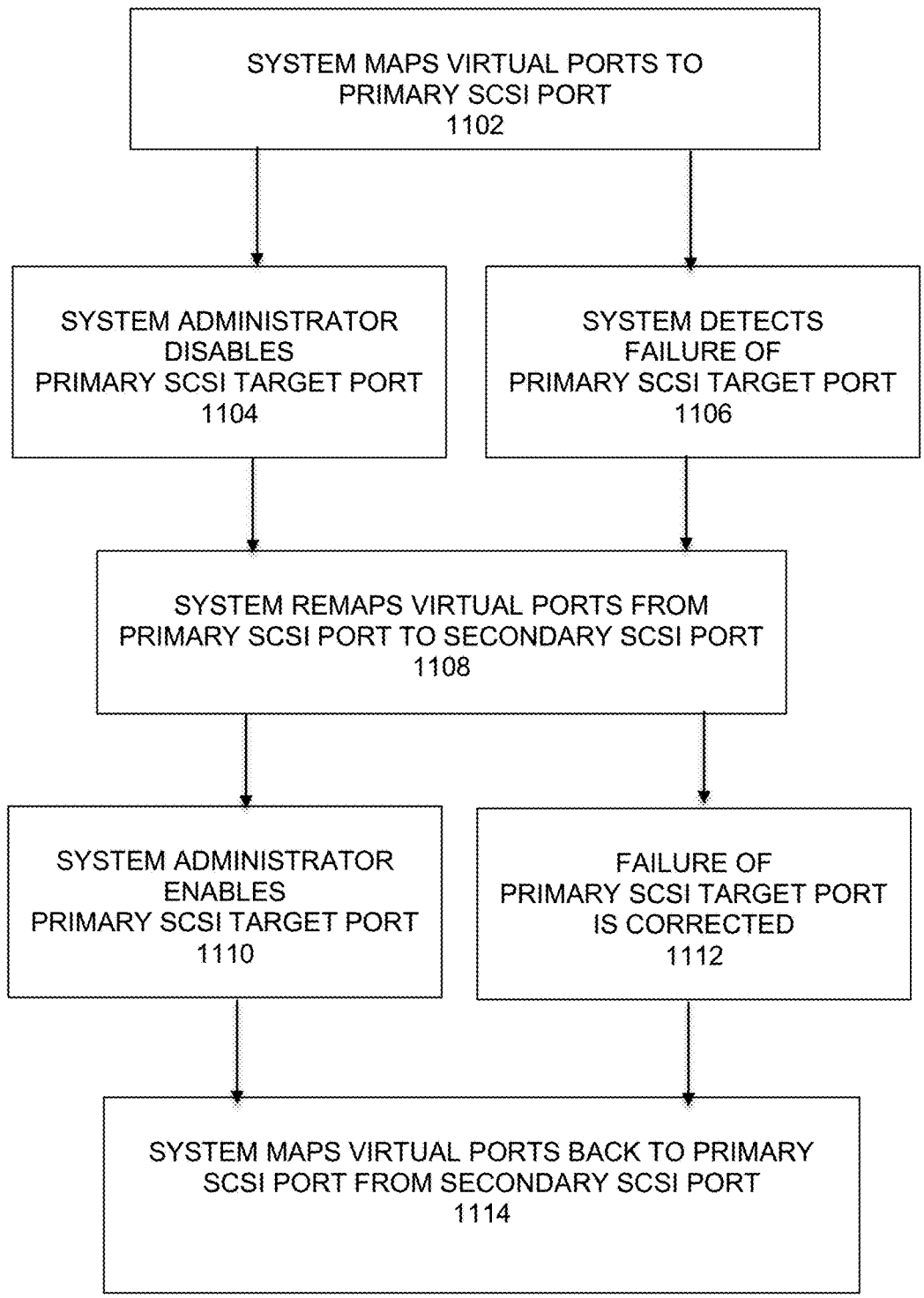
FIG. 11 is a flowchart that illustrates a method of providing administrative control over failover operation, under an embodiment.

Embodiments of the failover method also allow the control of virtual endpoint failover/failback during an administrative SCSI target port disable or enable operation. In this case, SCSI target virtual endpoints may failover to a secondary SCSI target port when the primary port fails. For example, when the primary port is corrected and enabled by the administrator the failover method pulls virtual endpoints on secondary ports back to the primary port under administrator control; and if and when an administrator wishes to manually disable a SCSI target port the failover operation pushes (failover) all virtual endpoints currently using the port as a primary to a secondary port. FIG. 11 is a flowchart that illustrates a method of providing administrative control over failover operation, under an embodiment. As shown in block 1002 of FIG. 11, the system first maps virtual ports to a primary SCSI (physical) port, such as PPorts of HBA 1 in FIG. 7 after failover is enabled. The failover operation may be triggered by a detected failure event 1106 and/or an administrative command issued by a system administrator to disable the primary port. The system then remaps the virtual ports from the primary port to a secondary port in accordance with a defined failover policy that may identify a sequence of possible secondary ports, block 1108. The re-mapped virtual ports maintain their same assigned WWPN numbers from the primary port, as shown in FIG. 10, which shows that virtual port 1006 maintains the same WWPN address (WWPN_1a0) after moving from HBA 1 to HBA 2. The secondary port now acts as the target port for any data transaction destined for the original primary port, and remains so until it fails or the primary port is brought back online. As shown in FIG. 11, the original primary port can be reinstated by the system administrator enabling the primary port after disabling it, 1110 and/or the failure condition being corrected so that the primary port is once again operational 1112. Upon reinstatement of the primary port, the system maps the virtual ports back to the primary port from the secondary port, block 1114.

As stated above, the term administrative means that a system administrator initiated the failover/failback operation, either through a CLI or using a user interface/management station. This is distinct from a system-initiated operation that may occur for example from a failure condition. The endpoint failover/failback operations can thus be triggered both by system actions and manually by a system administrator. For example: if a problem occurs in the SAN (e.g., a switch failure), it triggers an automatic (system-initiated) endpoint failover to a remaining available port, with a delay (e.g., wait_time parameter). The failure can be repaired, with the port remaining offline. The system administrator can then choose to enable the port and failback the endpoints, or can enable the port and leave the endpoints on their secondary location(s). An example of the latter might be if the system administrator wanted to run system tests before doing failback. Another case is if the system administrator wanted to administratively failback endpoints in smaller groups to verify correct operation.

Embodiments of the failover method further allow for asynchronous initiation and cancellation of failover and fallback of virtual endpoints in a SCSI target environment. The method controls failover and fallback operations of virtual endpoints in a SCSI target environment, where such operations may have different properties and be asynchronously initiated, and later selectively or globally cancelled based on multiple conditions. Both failover and failback operations may be set for automatic or manual operation in which the operation is initiated automatically after detection and notification of a failure condition after a specified wait_time period, or manually upon initiation of port disable by the system administrator. The wait time after notification of a failure to the actual initiation of virtual port re-mapping and failover to the second physical port can be independently set for different failover and failback instances. Likewise, cancellation of the failover operation can be based on certain defined conditions, and can be selectively canceled for certain endpoints or globally canceled for all failed-over endpoints.

Figure 12:
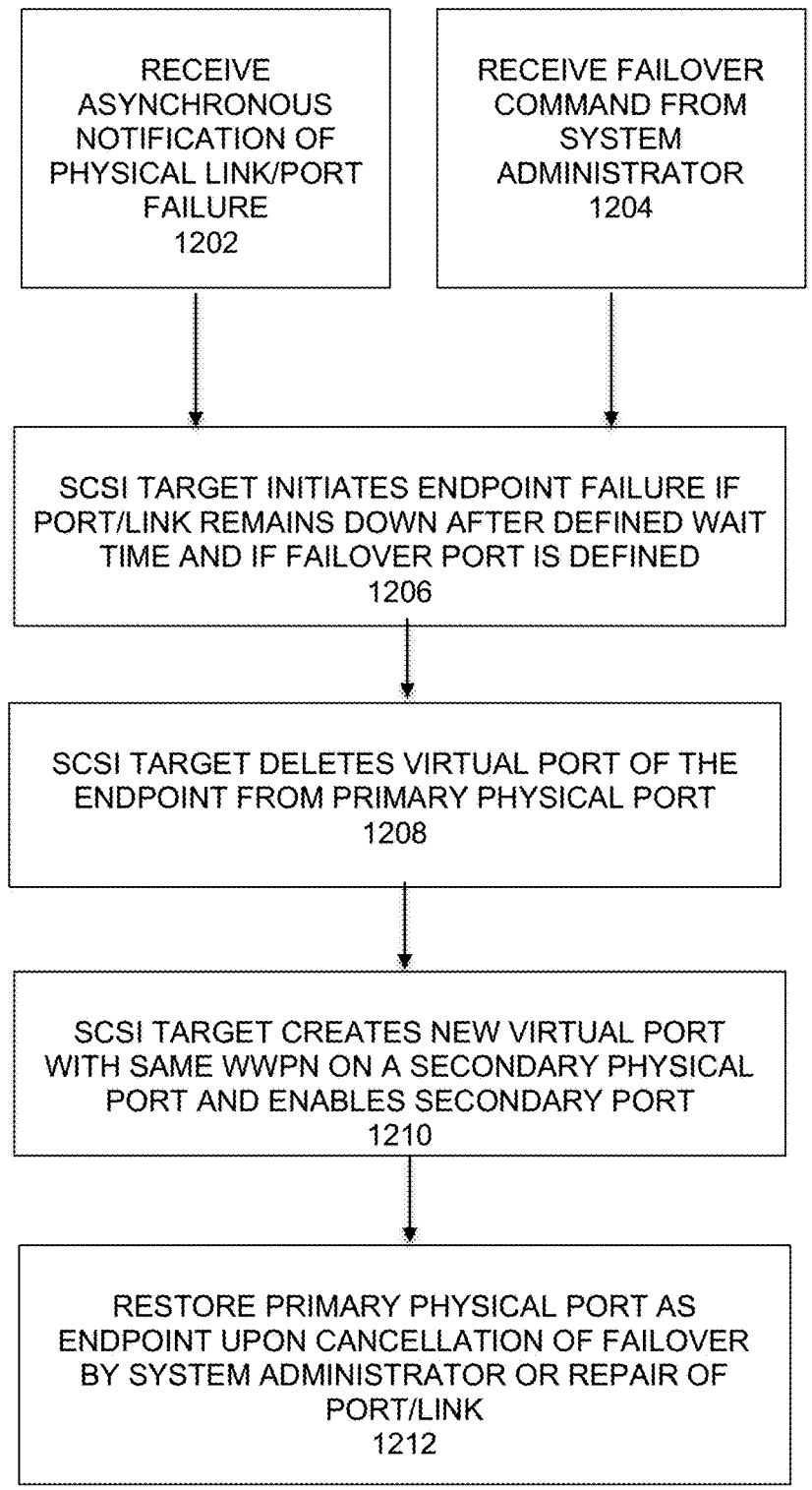
FIG. 12 is a flowchart that illustrates execution of a failover/failback operation, under some embodiments.

FIG. 12 is a flowchart that illustrates execution of a failover/failback operation, under some embodiments. As shown in FIG. 12, the failover operation may be initiated by a failover command received by the system administrator (manual trigger) 1204, or it may be triggered automatically upon detection of a failure condition 1202. In the automatic trigger case 1202, upon port failover the SCSI target will receive asynchronous offline notification from the SSM if the physical link or port goes down. Upon either manual or automatic trigger, the SCSI target will initiate endpoint failure if the defined policies are met 1206. As described above, the policies may define conditions such as wait period after a notification, verification of identity and availability and proper sequence of the secondary physical port, and so on. Upon initiation of the failover operation, the SCSI target deletes the virtual port form the primary physical port—which either failed or was disabled by the system administrator, 1208. The SCSI target then creates a new virtual port on a secondary port and enables the secondary port to receive data traffic intended for the primary physical port, 1210. The new virtual port is assigned the same WWPN as the virtual port on the primary port. The secondary port remains in operation until the failover operation is stopped or suspended by either cancellation of the failover by the system administrator or repair of the primary port, 1212.

In general, embodiments are directed to assigning or mapping a number of virtual ports to secondary ports as virtual endpoints so that in the event of failure (failover or admin command) of the primary port the system uses this mapping to determine different secondary physical ports to transmit data appropriately. For example, assume: (1) endpoint E1 has primary physical port P1, secondary port list P2, P3, P7, and (2) endpoint E2 has primary physical port P1, secondary port list P2, P5. Note that both endpoints E1 and E2 include P2 in their secondary port list, along with other ports. Now, if E1 and E2 are initially operating normally on physical port P1, and an event occurs to such that failover is triggered then those endpoints, at failover time, will be analyzed and failed over to secondary physical ports based on an implementation-defined policy or policies based on port identity, availability and operating conditions, e.g., E1 might move to P2; the system may then notice that too much traffic is on port P2 so E2 is moved to a different port on its secondary list (e.g., P5 in this case).

Although embodiments are described with respect to Fibre Channel systems, it should be noted that other transport protocols can also be adapted to use the virtualization methods described herein, including iSCSI and Fibre Channel over Ethernet (FCoE).

Embodiments may be applied to virtualizing SCSI transport endpoints to facilitate dynamic configuration of virtual ports and base ports in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform. It may also represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated and stored within the network may be stored in any number of persistent storage locations and devices, such as local client storage, server storage, or network storage. In an embodiment the network may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays, or flash memory devices.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of providing for failover of SCSI transport ports in a network, comprising:
defining a SCSI peripheral library (PLIB) comprising a simple access library providing a low-level interface to peripherals in the SCSI network to allow user space applications to utilize N-port ID virtualization (NPIV) functionality in an operating system kernel and perform endpoint creation on demand by the user space applications;
mapping, through an NPIV mapping component, a respective plurality of virtual endpoints to each of a plurality of physical ports through a mapping component that maps multiple virtual and physical endpoints to a single physical port, wherein each endpoint is an abstracted object having attributes that can be moved around the network;
defining, in the PLIB, each virtual port using a world-wide port number (WWPN) and a world-wide network name (WWNN) passed as arguments to an interface, wherein the WWPN names a port in the Fibre Channel network and the WWNN names a node in the network; and
upon triggering of a failover operation, dynamically re-mapping endpoints assigned to a primary physical port to a secondary physical port using a port table that contains both physical and virtual ports and that has unique port indices for physical ports and virtual ports.

2. The method of claim 1 further comprising:
assigning a virtual endpoint to a respective primary physical port and one or more secondary physical ports;
maintaining for the virtual endpoint, a list of the assigned respective primary physical port and the one or more secondary physical ports, wherein the list lists secondary physical ports in order of selection preference; and
upon the triggering, re-assigning the virtual endpoint to an available secondary physical port according to a defined policy.

3. The method of claim 2 wherein the PLIB comprises a modified Fibre Channel network peripheral library having a port table configured up to 256 bits to support a number of SCSI targets and accommodate the port indices, and wherein the port table contains both physical ports and virtual ports with a unique index across the physical ports and virtual ports, and further wherein the number of physical ports is static and the number of virtual ports is dynamic.

4. The method of claim 1 wherein the remapping is based on a defined policy and operating conditions, and wherein the defined policy comprises an identity and sequence of a secondary port determined from the list, an availability of the port, wait times for initiation of the failover operation, and one or more operating and performance characteristics of the network.

5. The method of claim 4 wherein the operating and performance characteristics comprise amount of network traffic to the available secondary physical port, network load imposed on the available secondary port, and reliability of the available secondary port.

6. The method of claim 1 wherein the triggering of the failover operation is initiated by one of a port failure condition or an administrative command to disable the primary physical port.

7. The method of claim 1 wherein the mapping and re-mapping is performed through a multi-threaded SCSI target daemon process that sends commands to an operating system of the network to create and maintain the list of the mapping.

8. A method of controlling failover operation among virtual SCSI transport ports in a SCSI network, comprising:
defining a SCSI peripheral library (PLIB) comprising a simple access library providing a low-level interface to peripherals in the SCSI network to allow user space applications to utilize N-port ID virtualization (NPIV) functionality in an operating system kernel and perform endpoint creation on demand by the user space applications;
creating, through the PLIB, a virtual port on a first physical port of the SCSI network and assigning the first virtual port a fixed world-wide port name (WWPN) through a mapping of multiple virtual and physical endpoints to a single physical port wherein each virtual port is defined using a respective WWPN and a world-wide network name (WWNN) passed as arguments to an interface, wherein the WWPN names a port in a Fibre Channel network and the WWNN names a node in the SCSI network using a port table that contains both physical and virtual ports and that has unique port indices for physical ports and virtual ports, and further wherein the number of physical ports is static and the number of virtual ports is dynamic;
in the event of a failover event of the first physical port, removing the virtual port from the first physical port and recreating the virtual port on a second physical port with the fixed WWPN to provide a failover port for data transactions intended for the first physical port; and
upon cancellation or correction of the failover event of the first physical port, restoring the virtual port back to the first physical port.

9. The method of claim 8 wherein the failover event comprises one of: a failure of the first physical port, or a system administrator command to disable the first physical port.

10. The method of claim 9 wherein the first and second physical ports and the virtual port are represented as endpoints comprising abstracted objects having attributes that are portable through a network including the networked device, the attributes specifying addressing and operating characteristics of an associated endpoint.

11. The method of claim 10 wherein the SCSI network comprises a Fibre Channel system implementing the SCSI transport ports, and wherein the data store is maintained by a server computer executing a data domain deduplication operating system, and further wherein the SCSI network comprises a storage area network, and wherein the first and second physical ports each comprise one of a host bus adapter or a storage device port, the method wherein the PLIB comprises a modified Fibre Channel network peripheral library having a port table configured up to 256 bits to support a number of SCSI targets and accommodate the port indices, and wherein the port table contains both physical ports and virtual ports with a unique index across the physical ports and virtual ports, and further wherein the number of physical ports is static and the number of virtual ports is dynamic.

12. The method of claim 9 wherein the failure triggers a failover operation, the method further comprising defining failover policies that govern execution of the failover operation and include parameters selected from the group consisting of: failure trigger conditions, wait times for initiation of port transfer, address and sequence of backup physical ports, and manual/automatic initiation of the failover operation, and wherein the failover operation comprises one of: a failover from a first data storage device to a second data storage device; and failback from the second storage device to the first storage device.

13. A method of controlling virtual SCSI transport ports in a SCSI network having a SCSI target, comprising:
defining a SCSI peripheral library (PLIB) comprising a simple access library providing a low-level interface to peripherals in the SCSI network to allow user space applications to utilize N-port ID virtualization (NPIV) functionality in an operating system kernel and perform endpoint creation on demand by the user space applications;
associating a first virtual port having a defined world-wide port number to a first physical port that serves as an endpoint in the SCSI network;
creating, through the PLIB, a second virtual port on a second physical port by assigning the defined world-wide port number for the first virtual port to the second virtual port so that the second virtual port serves as the endpoint during the failover operation; and
maintaining a list of the associations of the first and second virtual ports to appropriately transmit network traffic in the event of a failover operation triggered by a failure event or administrative command by mapping a respective plurality of virtual endpoints to each of a plurality of physical ports through a mapping component that maps multiple virtual and physical endpoints to a single physical port and defining each virtual port using a world-wide port number (WWPN) and a world-wide network name (WWNN) passed as arguments to an interface, wherein the WWPN names a port in the Fibre Channel network and the WWNN names a node in the SCSI network using a port table that contains both physical and virtual ports and that has unique port indices for physical ports and virtual ports.

14. The method of claim 13 wherein the failover operation transmits data intended for the first physical port to the second physical port until the failover operation is cancelled by one of: repair of the failure event or receipt of a cancel command from the system administrator, and wherein the failover operation is initiated in accordance with a defined failover policy.

15. The method of claim 14 wherein the wherein the PLIB comprises a modified Fibre Channel network peripheral library having a port table configured up to 256 bits to support a number of SCSI targets and accommodate the port indices, and wherein the port table contains both physical ports and virtual ports with a unique index across the physical ports and virtual ports, and further wherein the number of physical ports is static and the number of virtual ports is dynamic.

16. The method of claim 14 wherein the defined failover policy dictates at least one of: a delay period after the notification or receipt of the first command to initiate the failover operation, an identity and sequence of a plurality of physical ports to act as the second physical port, and an automatic/manual mode of the failover operation.

17. The method of claim 8 wherein the first and second virtual ports represent endpoints that are abstracted objects having attributes that can be moved around the SCSI network, the method further comprising managing the endpoint through a multi-threaded SCSI target daemon process that sends commands to the SCSI target.

18. The method of claim 13 wherein the SCSI network comprises a Fibre Channel system implementing the SCSI network, and wherein the attributes for physical ports include firmware version, physical presence, and link speed; and further wherein the attributes for virtual ports include host initiator identifiers; WWPN addresses, WWNN addresses and fcp2-retry state, and yet further wherein an operating system of the SCSI network comprises a data domain deduplication operating system, and wherein the network comprises a storage area network, and wherein the first and second virtual ports are mapped to the first and second physical ports through an N_Port ID (NPIV) mapping for the Fibre Channel system.

19. A computer program product comprising a non-transitory computer usable medium having machine readable code embodied therein for controlling failover operation among virtual SCSI transport ports in a SCSI network, by:
defining a SCSI peripheral library (PLIB) comprising a simple access library providing a low-level interface to peripherals in the SCSI network to allow user space applications to utilize N-port ID virtualization (NPIV) functionality in an operating system kernel and perform endpoint creation on demand by the user space applications;
mapping, through an NPIV mapping component, a respective plurality of virtual endpoints to each of a plurality of physical ports through a mapping component that maps multiple virtual and physical endpoints to a single physical port, wherein each endpoint is an abstracted object having attributes that can be moved around the network;
defining, in the PLIB, each virtual port using a world-wide port number (WWPN) and a world-wide network name (WWNN) passed as arguments to an interface, wherein the WWPN names a port in the Fibre Channel network and the WWNN names a node in the network; and
upon triggering of a failover operation, dynamically re-mapping endpoints assigned to a primary physical port to a secondary physical port using a port table that contains both physical and virtual ports and that has unique port indices for physical ports and virtual ports.

* * * * *